United States Patent
Yagura et al.

(10) Patent No.: US 6,671,453 B2
(45) Date of Patent: *Dec. 30, 2003

(54) IMAGE REPRODUCING APPARATUS

(75) Inventors: Hirokazu Yagura, Sakai (JP);
Toshiyuki Tanaka, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 08/739,698

(22) Filed: Oct. 29, 1996

(65) Prior Publication Data

US 2003/0059198 A1 Mar. 27, 2003

(30) Foreign Application Priority Data

Oct. 30, 1995 (JP) ............................................. 7-282298

(51) Int. Cl.[7] ................................................ H04N 5/76
(52) U.S. Cl. ............................................ 386/46; 386/68
(58) Field of Search ........................... 386/130, 46, 111, 386/95, 52, 107, 117, 80, 68; 358/906, 909.1; 348/96, 97, 567, 581; 345/761

(56) References Cited

U.S. PATENT DOCUMENTS

| | | | | | |
|---|---|---|---|---|---|
| 4,546,349 A | * | 10/1985 | Prohofsky | .................. | 345/667 |
| 5,091,785 A | * | 2/1992 | Canfield et al. | ............. | 348/567 |
| 5,302,968 A | * | 4/1994 | Heberle | ....................... | 345/761 |
| 5,424,667 A | * | 6/1995 | Sakai et al. | .................. | 327/115 |
| 5,541,644 A | | 7/1996 | Nanba | .......................... | 348/96 |
| 5,546,122 A | * | 8/1996 | Asami et al. | .................. | 348/96 |
| 5,655,051 A | * | 8/1997 | Furuta et al. | ................ | 386/105 |
| 5,673,079 A | * | 9/1997 | Satoh | ........................... | 348/14 |
| 5,684,918 A | * | 11/1997 | Abecassis | ..................... | 386/46 |
| 5,699,109 A | * | 12/1997 | Nishimura et al. | ............ | 348/97 |
| 5,729,284 A | * | 3/1998 | Ishii et al. | ..................... | 348/96 |

* cited by examiner

Primary Examiner—Huy Nguyen
(74) Attorney, Agent, or Firm—McDermott, Will & Emery

(57) ABSTRACT

An image reproducing apparatus includes: an image pick up device which picks up an image recorded on a recording medium; a reproduction designator which designates a reproduction area of the picked up image and sets a reproduction manner of reproducing an image in the reproduction area; a control change amount setter which calculates a change amount of reproduction state of the image every a predetermined period based on the set reproduction manner and sets a control change amount based on the calculated change amount; and a controller which controls the reproduction in such a way that the reproduction state changes at the set control change amount.

11 Claims, 35 Drawing Sheets

FIG. 8
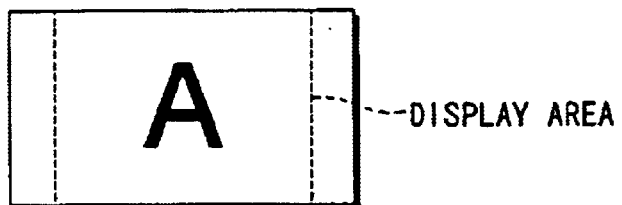
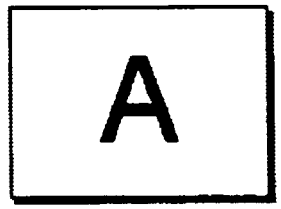
FIG. 9
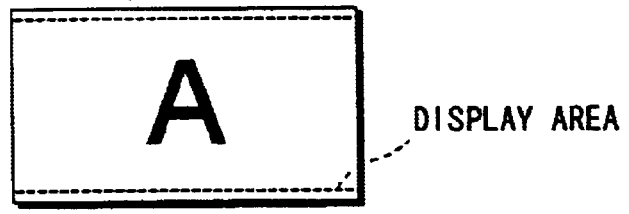
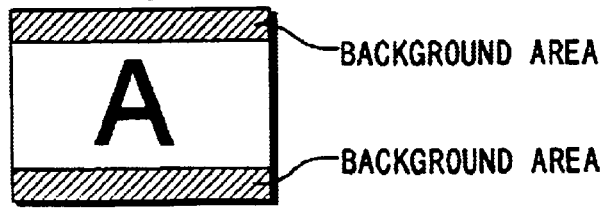

DIRECTION TOWARD LEADING END OF FILM

FIG. 16
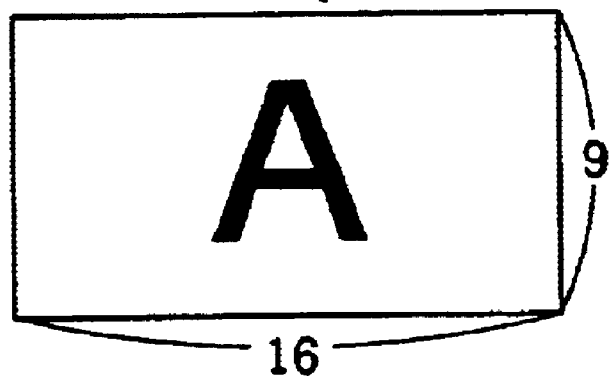
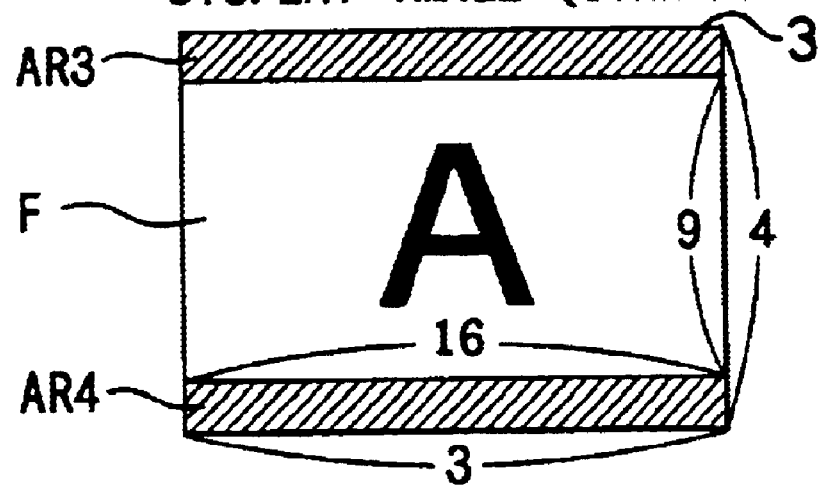

FIG. 20A
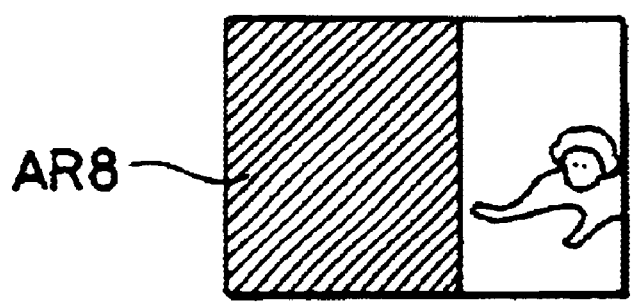
FIG. 20B
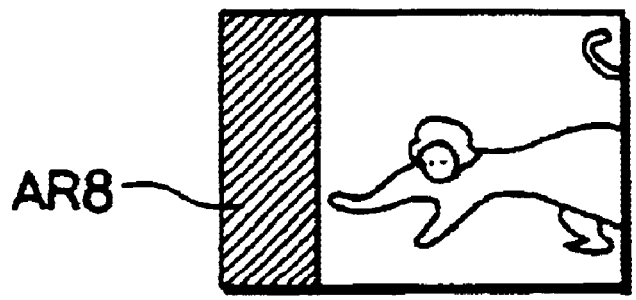
FIG. 20C
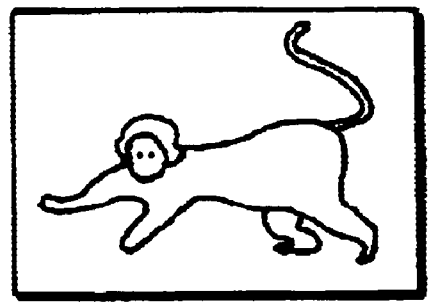

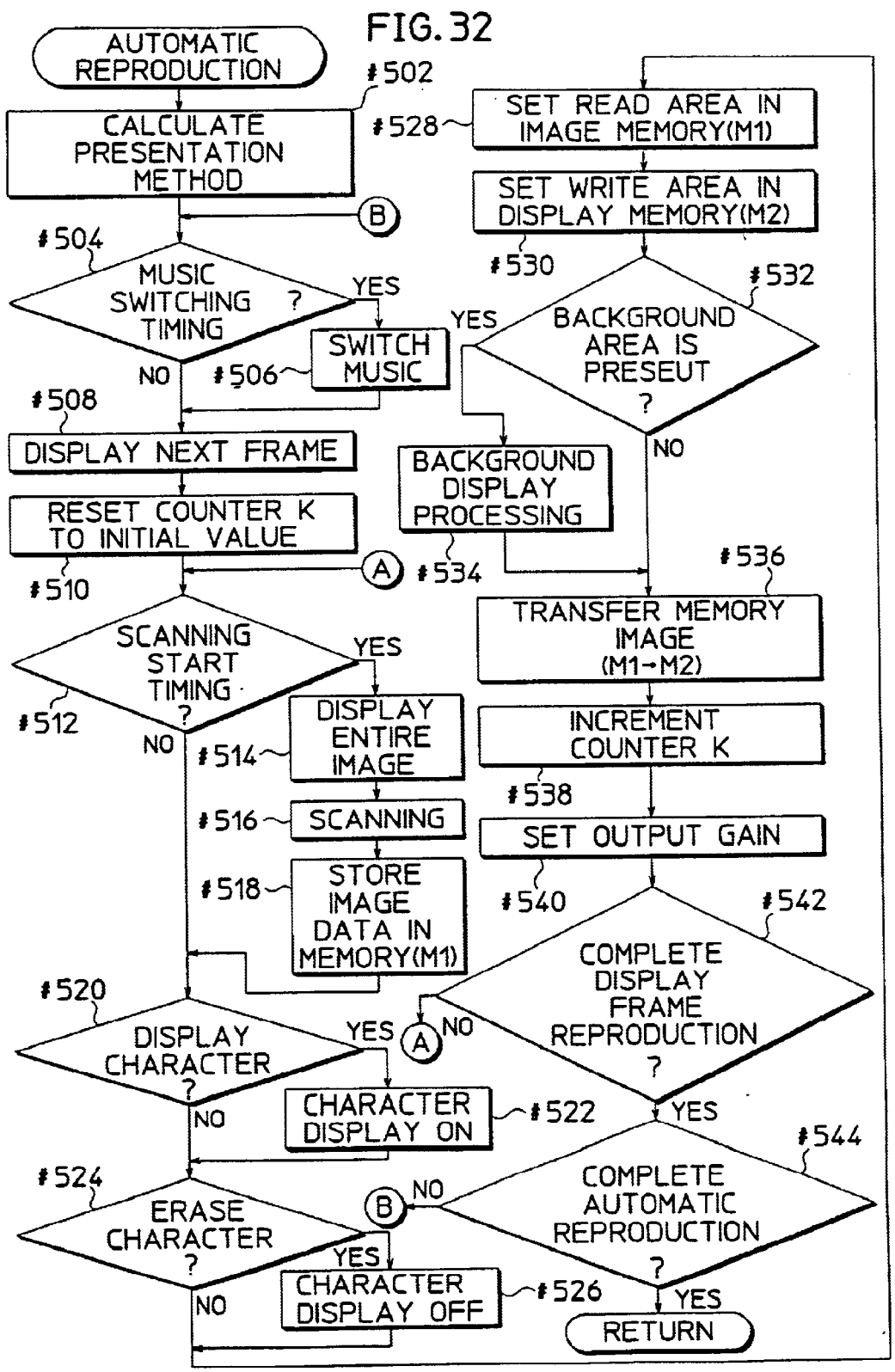

$p = (m+1)/2 - y$
$q = (n+1)/2 + x$
$p' = (m+1)/2 + y$
$q' = (n+1)/2 - x$
$p + p' = m+1 \rightarrow p' = m+1-p$
$q + q' = n+1 \rightarrow q' = n+1-q$

FIG. 56

| | ORIENTATION OF FILM IMAGE | | | |
|---|---|---|---|---|
| | UPWARD | DOWNWARD | TO LEFT | TO RIGHT |
| UP-KEY (TILT-UP) | MOVING DIRECTION +y DIRECTION | MOVING DIRECTION −y DIRECTION | MOVING DIRECTION −x DIRECTION | MOVING DIRECTION +x DIRECTION |
| DOWN-KEY (TILT-UP) | −y DIRECTION | +y DIRECTION | +x DIRECTION | −x DIRECTION |
| RIGHT-KEY (TILT-UP) | +x DIRECTION | −x DIRECTION | +y DIRECTION | −y DIRECTION |
| LEFT-KEY (TILT-UP) | −x DIRECTION | +x DIRECTION | −y DIRECTION | +y DIRECTION |

IMAGE REPRODUCING APPARATUS

BACKGROUND OF THE INVENTION

This invention relates to an image reproducing apparatus for picking up images recorded in the respective frames of a developed film by an image pickup device and displaying the picked up images on a displace device such as a CRT (Cathode Ray Tube).

There is known a film image reproducing apparatus in which images recorded in the respective frames of a film (hereafter, film images) are picked up by an image pickup device such as a CCD (Charge Coupled Device) image sensor, and are subject to specified processings and reproduced on a monitor TV to display the film images.

For example, Japanese Unexamined Patent Publication No. 6-209429 discloses a film image reproducing apparatus capable of displaying film images in an animated manner by using a panning/tilting function or zoom-up/zoom-down function.

In this film image reproducing apparatus, there are provided an image memory for storing image data obtained by the image pick up device, a presentation processing portion for processing the image data for animated presentation such as fade-in/fade-out, and a displaying portion for converting the image data into an NTSC signal to display the film image on the monitor TV. The film image reproducing apparatus generates display data for the monitor TV by processing the image data stored in the memory in accordance with a specified animated display.

In the case of panning/tilting display, the image memory is set with a read area corresponding to a display area of the monitor TV. The display data is generated from the image data in the read area. The animated display data is generated by moving the read area in the image memory each frame image display cycle of the monitor TV.

In the case of zoom-up/zoom-down display, the image data in the read area is processed in a manner to expand or contract the film image at a specified magnification each frame image display cycle of the monitor TV.

As an animated display of still image, there has been proposed a manner of displaying a still image animatedly by changing the still image at a constant speed. However, in such display, since the changing speed is constant, the presentation is limited to a small number of variations. Accordingly, the animated display cannot be performed sufficiently.

For this reason, it is preferable to set the animated display presentation manner by a display time, an image at the beginning of animated display, and an image at the end of animated display. In this case, the still image can be animatedly displayed at an arbitrary speed v which is defined by the change amount CA between the beginning image and the end image and the display time t, i.e., $V=CA/t$, thus providing an increased number of presentations.

In such display device as monitor TV, however, the animated display is performed by renewing the frame image at the predetermined cycle $\tau v$ (1/60 second), the change speed of display image on the monitor TV cannot set other than an intermittent speed v' which is an integer multiple of pixel interval of the display screen of the monitor TV. Accordingly, if the change speed v determined by the above three parameters is not acceptable, the change speed is required to be amended to the acceptable speed v'. This amendment causes a variation in the change speed in each display cycle, and impairs the smooth animated display.

For example, in the case that the animated display is performed in such a manner that a display image moves 400 pixels on the display screen in 300 (vd), a change amount $\Delta d$ is expressed by $\Delta d = 400/300 \approx 1.33$ (pixel/vd). A total change amount D in the period P of each cycle is expressed by $D = P \times \Delta d$. The total change amount D is required to be rounded down into a rounded total change amount D' because having fraction part. As shown in TABLE-1, consequently, there occurs a variation in differences $\Delta L'$ between adjacent rounded total change amount D'. This variation causes a variation in the change speed of the animated display image.

TABLE 1

| CYCLE PERIOD P' | — | 149 | 150 | 151 | 152 | 153 | 154 | — |
|---|---|---|---|---|---|---|---|---|
| TOTAL CHANGE AMOUNT D | — | 198.7 | 200.0 | 201.3 | 202.7 | 204.3 | 205.3 | — |
| ROUNDED CHANGE AMOUNT D' | — | 198.0 | 200.0 | 201.0 | 202.0 | 204.0 | 205.0 | — |
| DIFFERENCE $\Delta L'$ | — | | 2.0 | 1.0 | 1.0 | 2.0 | 1.0 | — |

The variation in the change speed of the display image makes the animated display unnatural, thereby giving a viewer a sense of incongruity.

SUMMARY OF THE INVENTION

It is an object of the present invention to provide an image reproducing apparatus which has overcome the problems residing in the prior art.

It is another object of the present invention to provide an image reproducing apparatus which can ensure a smooth animated display of a still image.

According to one aspect of the present invention, an image reproducing apparatus comprising: an image pick up device which picks up an image recorded on a recording medium; a reproduction designator which designates a reproduction area of the picked up image and sets a reproduction manner of reproducing an image in the reproduction area; a control change amount setter which calculates a change amount of reproduction state of an image in the reproduction area every a predetermined period based on the set reproduction manner and sets a control change amount based on the calculated change amount; and a controller which controls the reproduction in such a way that the image reproduction state changes at the set control change amount.

The control change amount setter may be made to calculate a change amount using a total change amount defined in the set reproduction manner. The control change amount setter may be made to calculate a change amount using a changing time defined in the set reproduction manner. The control change amount setter may be made to calculate a change amount using a total change amount and a changing time defined in the set reproduction manner.

The control change amount may be set at a fixed value.

The reproducing apparatus may be further provided with a memory having addresses for storing the picked up image, wherein the calculated change amount corresponds to an address reading speed of the memory.

The reproducing apparatus may be further provided with a reproduction device having a reproduction portion in which an image in the reproduction area is reproduced. The reproduction device may be a CRT display device. The control change amount may be set taking into consideration an interval of display elements of the CRT display device.

According to another aspect of the present invention, an image reproducing apparatus comprising: an image pick up device which picks up an image recorded on a recording medium; a presentation manner setting device which sets a presentation manner of presenting the picked up image; and a control value setter which sets a control value to ensure a smooth reproduction of the picked up image based on the set presentation manner.

The control value may be a value to ensure a constant change of the reproduction of the picked up image.

The presentation manner setting device may be made to set a total change amount and a changing time of the reproduction of the picked up image. The set presentation manner may be a manner of reproducing a plurality of images switchingly. The set presentation manner may be a manner of reproducing an image animatedly.

The control value may be set based on the set total change amount and changing time. In the case of being provided with a display device, the control value may be a value to ensure a constant change of the reproduction of the picked up image every display interval of the display device.

As described above, according to the inventive image reproducing apparatus, the control change amount setter calculates a change amount of reproduction state of an image in the reproduction area every a predetermined period based on the set reproduction manner and sets a control change amount based on the calculated change amount. The reproduction is controlled in such a way that the image reproduction state changes at the set control change amount. Accordingly, the image in the reproduction area can be smoothly changed.

These and other objects, features and advantages of the present invention will become more apparent upon a reading of the following detailed description and accompanying drawings.

BRIEF DESCRIPTION OF THE DRAWINGS

FIG. 8 is a diagram showing a method of changing a film image of high vision size into a display image of standard size;

FIG. 9 is a diagram showing a method of changing a film image of high vision size into a display image of panorama size;

FIG. 16 is a diagram showing background areas created when the entire film image of high vision size is displayed on the display screen of standard size;

FIGS. 20A to 20C are diagrams showing a background area created when an animated display is made by scroll-in/out;

FIG. 32 is a flowchart showing a subroutine "Automatic Reproduction";

FIG. 56 is a table showing moving directions of the read area of the image memory in correspondence with the operation directions of a panning/tilting key.

DETAILED DESCRIPTION OF THE PREFERRED EMBODIMENTS OF THE INVENTION

Figure 1:
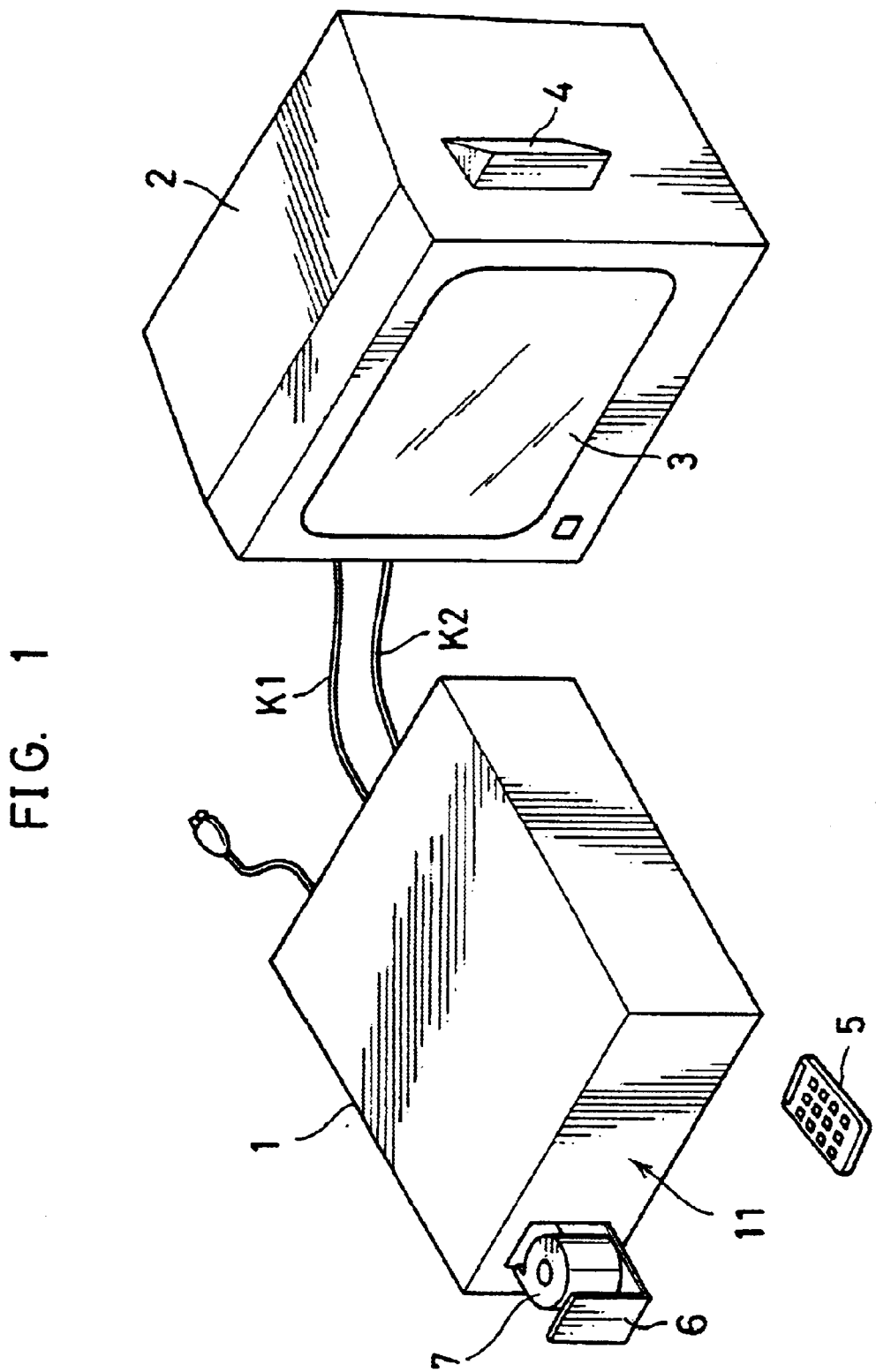
FIG. 1 is a perspective view of a film image reproducing apparatus according to the invention connected with a monitor TV.
Figure 2:
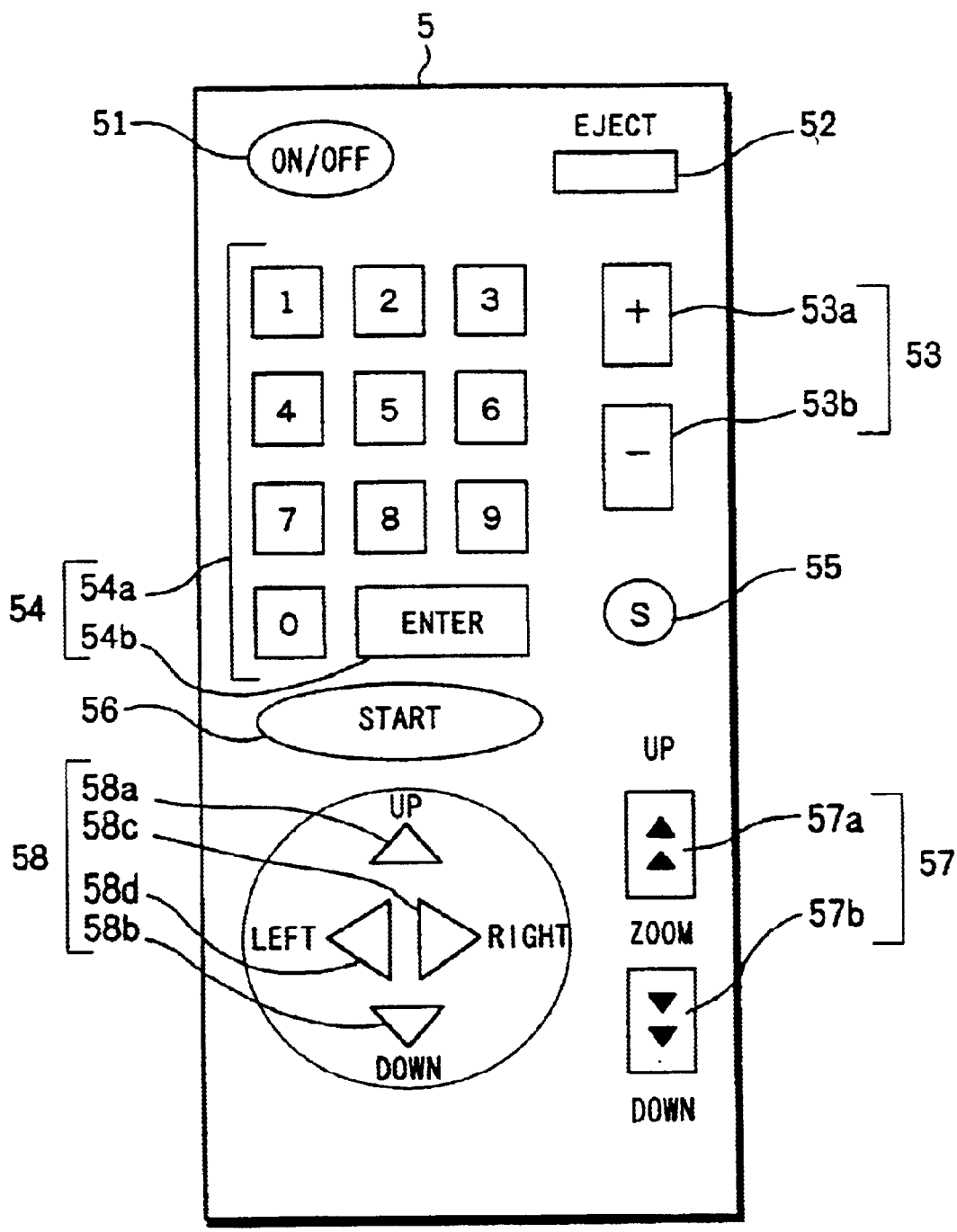
FIG. 2 is a plan view of a remote controller.

FIG. 1 is a perspective view of a film image reproducing apparatus 1 connected with a monitor TV 2.

The apparatus 1 is used after being connected with a monitor TV 2 via a video signal cable K1 and an audio signal cable K2, and is adapted to pick up film images recorded in the respective frames of a developed film 8 contained in a film cartridge 7 by an image pickup device such as a CCD and to reproduce the picked up image (hereafter, "pick-up image") on the monitor TV 2 in accordance with set presentation conditions.

The presentation conditions include conditions concerning the reproduction of the film images and conditions concerning effect sounds such as a BGM. The film images are reproduced on a display screen 3 of the monitor TV 2 and the effect sounds are made audible by a pair of loudspeakers 4 arranged at the opposite sides of the monitor TV 2.

The film image display presentation methods include a display frame switch method of switching a display frame such as fade-in/fade-out, overlapping, wipe-in/wipe-out, and scroll and an animated display method of moving an image area to be displaced over time such as panning/tilting and zoom-up/zoom-down. The images are displaced by a variety of presentation methods obtained by combining the above two methods. Accordingly, the presentation conditions concerning the reproduction of the film images include a variety of conditions such as the display frame switch method, the animated display method, the superimposition of a character information, and the designation of the frames to be displayed.

The presentation conditions concerning the effect sounds mainly include the selection of BGM for the frames, and a song switch method such as fade-in and fade-out. A volume change method of changing the volume according to the change in the display image in the animated display can be counted as one of such presentation conditions. Further, narration may be inserted. The presentation by a volume control is described later.

The reproducing apparatus 1 is provided with an automatic reproduction mode. When this mode is designated, the presentation conditions are automatically set for the designated frames in accordance with a preset program, and the respective frames are automatically continuously reproduced in accordance with the set presentation conditions. This automatic reproduction mode is described later.

The reproducing apparatus 1 is provided with an eject table 6 at a left side of its front panel when viewed from front. The eject table 6 is adapted to place the film cartridge 7 in a film loader arranged in the reproducing apparatus 1. The eject table 6 is slidably provided so that it can project and retract with respect to the front panel. The film cartridge 7 is fitted to a spool projecting from the bottom surface of the eject table 6, and is placed in the film loader when the eject table 6 retracts into the reproducing apparatus 1.

The reproducing apparatus 1 is also capable of performing a variety of operations by means of an operation unit 11 provided at the front panel or a remote controller 5.

The remote controller 5 has a power key 51, an eject key 52, a display frame switch key 53, a display frame designation key 54, a skip key 55, an automatic reproduction key 56, a zoom key 57 and a panning/tilting key 58.

The power key 51 is operated to turn the power of the reproducing apparatus 1 on and off. The eject key 52 is operated to eject the film cartridge 7 loaded in the film loader. When the eject of the film cartridge 7 is designated by the eject key 52, the eject table 6 projects out of the apparatus 1 after the film 8 set in the film loader is rewound into the film cartridge 7, thereby enabling the film cartridge 7 to be taken out.

The display frame switch key 53 is operated to switch the display frame of the monitor TV 2, and includes a "+" key 53a and a "−" key 53b. The frame number of the display frame is increased by operating the "+" key 53a, and is decreased by operating the "−" key 53b.

The display frame designation key 54 includes ten entry keys 54a and an enter key 54b. The number of the frame to be reproduced is designated by the ten entry keys 54a, and the designated frame number is input (set) by the enter key 54b. The skip key 55 is operated to designate a frame which needs not be reproduced such as a frame recording a failure image or an unexposed frame. The frame designated by the skip key 55 is skipped in the automatic reproduction mode and, therefore, is not reproduced.

The automatic reproduction key 56 is operated to designate the reproduction by the automatic reproduction mode. When the automatic reproduction mode is designated by the key 56, the presentation conditions concerning the image display and the effect sounds are automatically set for the respective frames designated by the display frame designation key 54, and the film images of the respective frames are reproduced in succession on the monitor TV 2 in accordance with the set presentation conditions.

Figure 3:
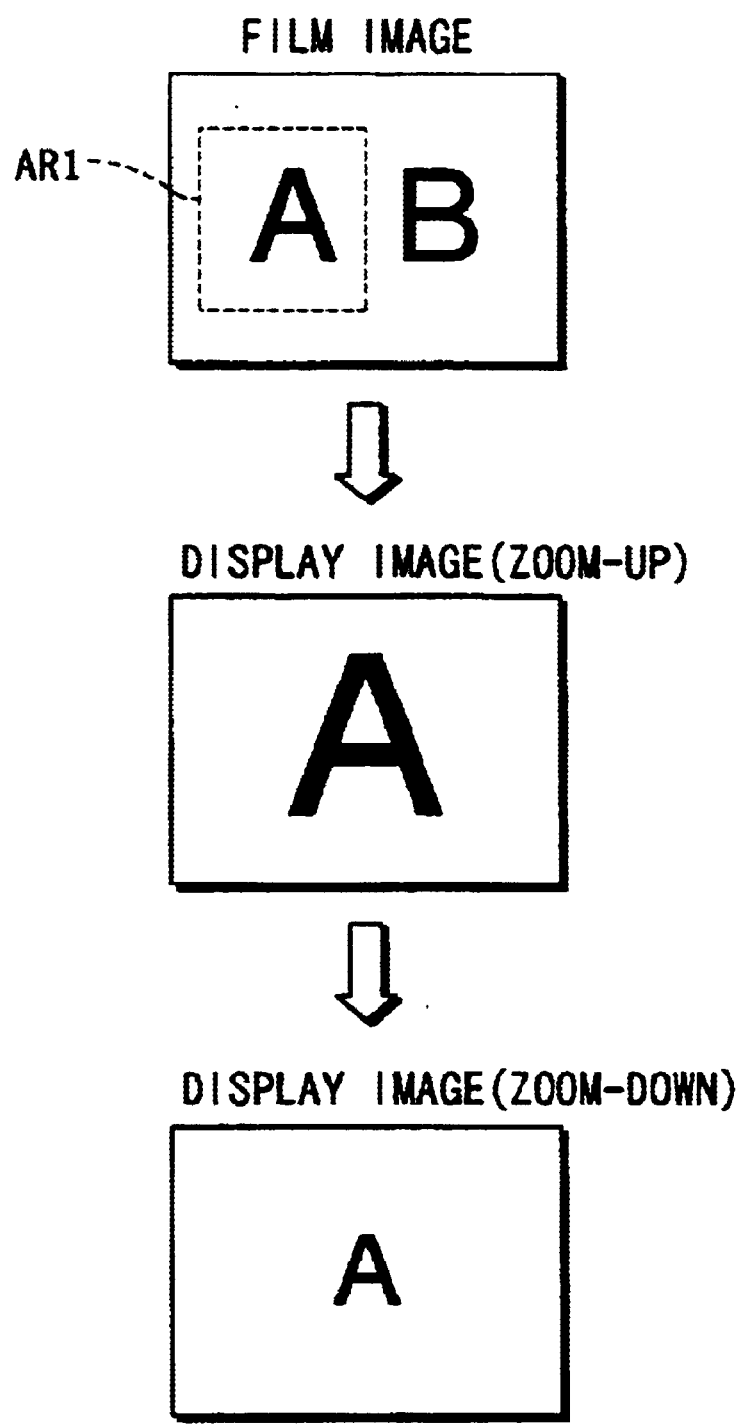
FIG. 3 is a diagram showing an example of images displayed by zooming-up and zooming-down.

The zoom key 57 includes an up-key 57a and a down-key 57b, and is operated to change the display magnification of the display image. As shown in FIG. 3, the display magnification of the image in a zoom area AR1 ("A" in FIG. 3) is increased by operating the up-key 57a and decreased by operating the down-key 57b.

The panning/tilting key 58 includes an up-key 58a, a down-key 58b, a right-key 58c, and a left-key 58d. In a display by panning/tilting, a part of the film image is displayed on the display screen 3, and the area where the film image is displayed moves according to the operation of the panning/tilting key 58.

Figure 4:
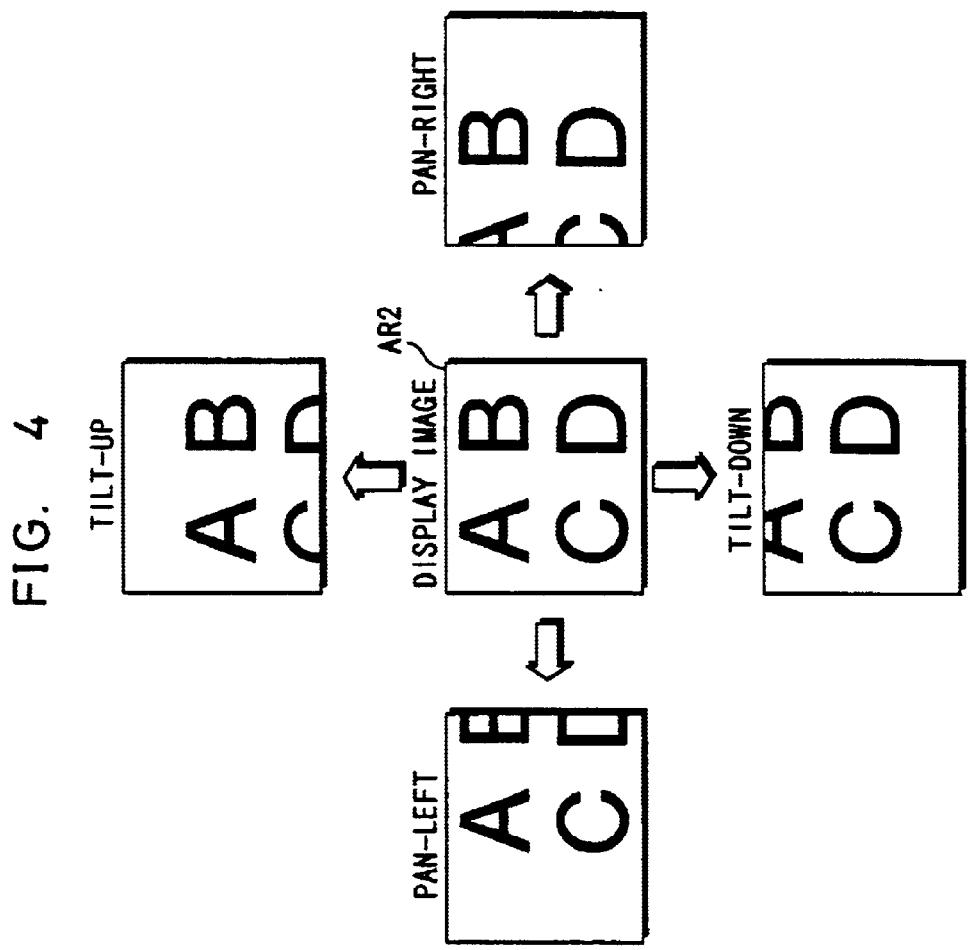
FIG. 4 is a diagram showing an example of images displayed by tilting and panning.

More specifically, as shown in FIG. 4, a display area AR2 of the film image displayed on the monitor TV 2 is moved upward by operating the up-key 58a (tilt-up) and moved downward by operating the down-key 58b (tilt-down) during tilting. Further, the display area AR2 of the film image displayed on the monitor TV 2 is moved to the right (pan-right) by operating the right-key 58c and moved to the left (pan-left) by operating the left-key 58d during panning.

The operation unit 11 is provided with keys having the same functions as the remote controller 5 and, accordingly, can perform the same operations as above. A roll of a developed film 8 is contained in the film cartridge 7.

Figure 5:
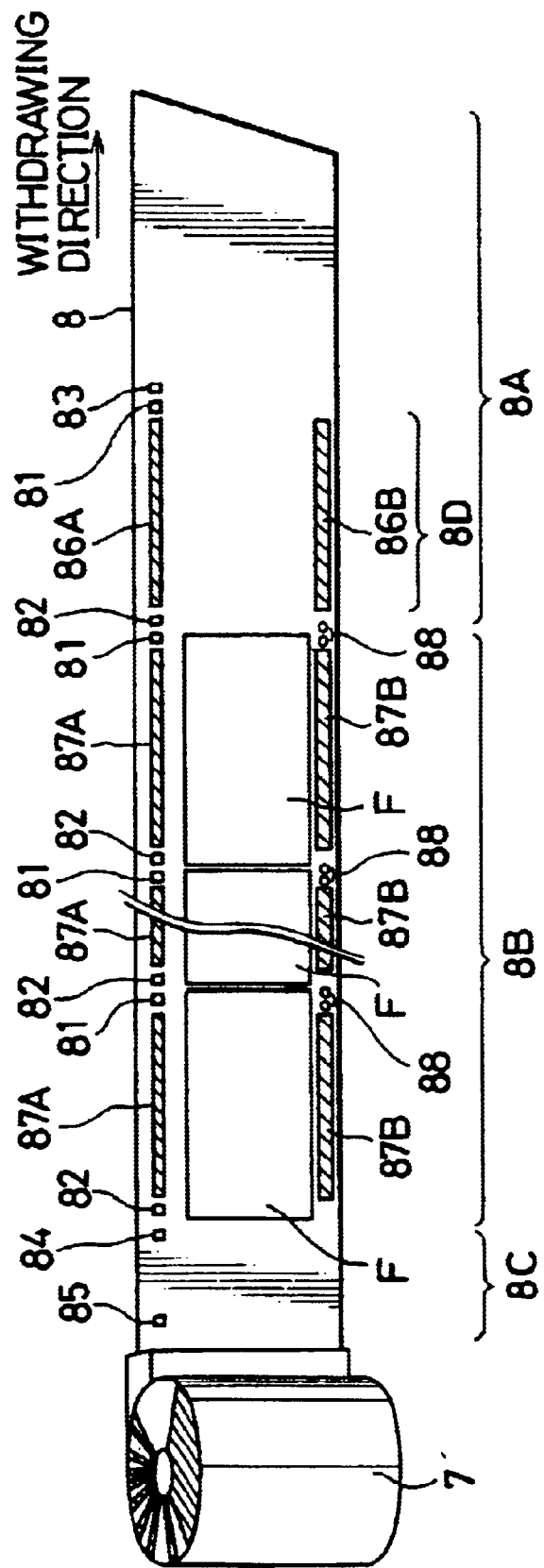
FIG. 5 is a diagram showing the configuration of a film used in the film image reproducing apparatus according to the invention.

FIG. 5 is a diagram showing the configuration of a film used in the film image reproducing apparatus 1.

The film 8 contained in the film cartridge 7 includes a film leader 8A, an image recording portion 8B and a film end 8C in this order from the leading end thereof.

The film leader 8A is a lead portion provided to withdraw the film 8 from the main body of the film cartridge 7. Behind the film leader is provided an unexposed area 8D having a size of substantially one frame. The image recording portion 8B is where a specified number of images are recorded at specified intervals. The images in the respective frames F have an aspect ratio of high vision size (height:width=9:16), and is longer in the transverse direction than the image of standard size (aspect ratio (height:width=3:4). The film end 8C is an unexposed area provided at the rear end of the film 8 to withdraw the image recording portion 8B from the film cartridge main body 7 by a predetermined length or longer.

In the following description, the lengthwise and widthwise directions of the film are referred to horizontal and vertical directions if necessary so as to conform to the construction of the film images of the respective frames F.

A plurality of rectangular holes 81 to 85 (hereinafter, perforations 81 to 85) are formed at an upper edge of the film 8. The perforations 81, 82 indicate the position of the unexposed area 8D and those of the respective frames F. The perforations 81 are located at the front end positions of the unexposed area 8D and the respective frames F, whereas the perforations 82 are located at the rear end positions thereof.

The perforation 83 indicates the leading end of magnetic recording portions 86A, 86B of the film leader 8A, and is located more forward than the perforation 81 indicative of the front end position of the unexposed area 8D by a specified distance. The perforation 84 indicates the front end position of the film end 8C, and is located more backward than the perforation 82 indicative of the rear end position of the last frame F by a specified distance. The perforation 85 indicates the rear end position of the film end 8C, and is located more backward than the perforation 84 by a specified distance.

The horizontal dimension of the film end 8C is set shorter than that of each frame F, and a distance between the perforations 84 and 85 is shorter than that between the perforations 81 and 82.

The perforations 81 to 85 are detected by a photoreflector, and the film is fed to a read start position of the film image of each frame F using a detection signal of the photoreflector.

An information 88 representing a reproduction format of the film image (hereafter, a format information) is optically recorded below a lower right corner of the film image of each frame F. The format information 88 is an information to designate an aspect ratio of the image recorded in each frame F, and three kinds of aspect ratios of standard size, high vision size and panorama size can be designated. The format information 88 is a two bit information and is recorded during photographing by a camera.

Along the upper and lower edges of the film 8, strip-like magnetic recording portions 86A, 86B, 87A and 87B are so formed as to conform to the unexposed area 8D and the respective frames F at the opposite sides of the unexposed area 8D and the respective frames F.

The magnetic recording portion 86A provided at the upper end of the film 8 is formed between the perforation 81 indicative of the front end position of the unexposed area 8D and the perforation 82 indicative of the front end position thereof. Each magnetic recording portion 87A is formed between the perforations 81, 82 indicative of the front and rear end positions of each frame F. The magnetic recording portions 87B at the lower edge of the film 8 so as to correspond to the respective frames F are formed adjacent to the format information 88.

An index information concerning the film 8 is magnetically recorded in the magnetic recording portions 86A, 86B.

The index information is an overall information of the film 8 such as the number of photographing, titles of photographed contents, a frame size such as a half size and a full size, and presentation conditions.

An information peculiar to the film image of each frame F (hereafter, frame information) is recorded in the magnetic recording portions 87A, 87B. The frame information includes an information concerning photographing (hereafter, photo-graphing information) and an information concerning development (hereafter, development information). The development information is recorded in the magnetic recording portion 87A, whereas the photographing information is recorded in the magnetic recording portion 87B.

The photographing information includes a date of photographing, a frame construction (the orientation of the image) with respect to the vertical direction, an exposure condition, and a magnification, and is automatically or manually recorded by a camera operator during photographing. The development information includes, for example, the exposure condition and the number of prints to be made, and is recorded during the development.

Figure 6:
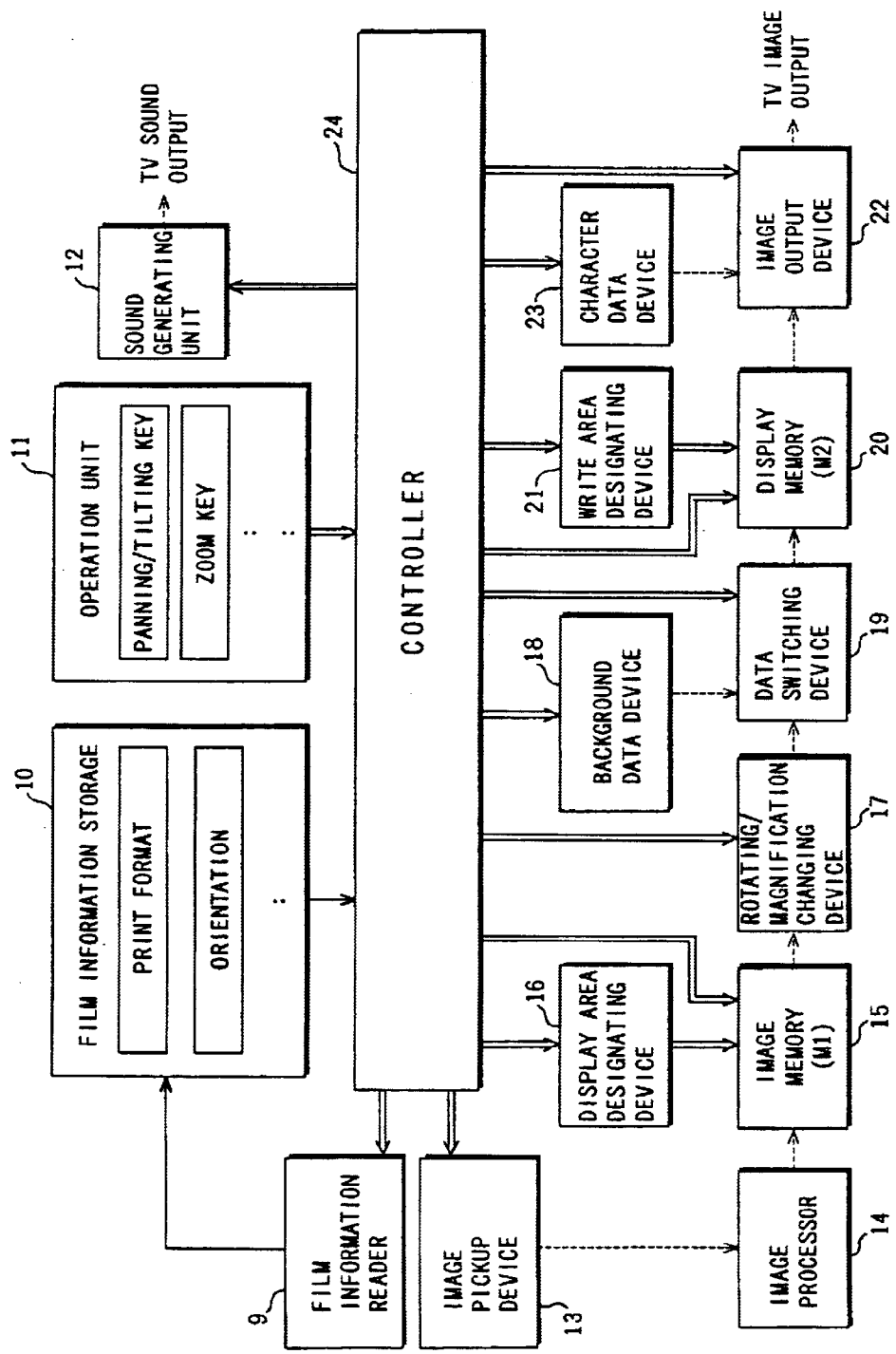
FIG. 6 is a block diagram of the film image reproducing apparatus.

FIG. 6 is a block diagram of the film image reproducing apparatus 1.

In FIG. 6, a double line arrow, a solid line arrow and a dotted line arrow indicate flows of control signals, the magnetic information and the image data.

A film information reader 9 reads the index information, the frame information and other magnetic information which are magnetically recorded in the magnetic recording portions 86A, 86B, 87A, 87B of the film 8. The magnetic information are read during the prescanning which is automatically performed when the film is loaded as described later.

A film information storage 10 is adapted to store the magnetic information read by the film information reader 9. The storage 10 is reloadable, and a new information is written over an old one by the controller 24 if necessary. The operation unit 11 is operated to input the operated contents of a variety of keys to the controller 24. The storage 10 has a light receiving portion for receiving a light signal from the remote controller 5, and decodes the content of the light signal and inputs the decoded content to the controller 24.

Figure 7:
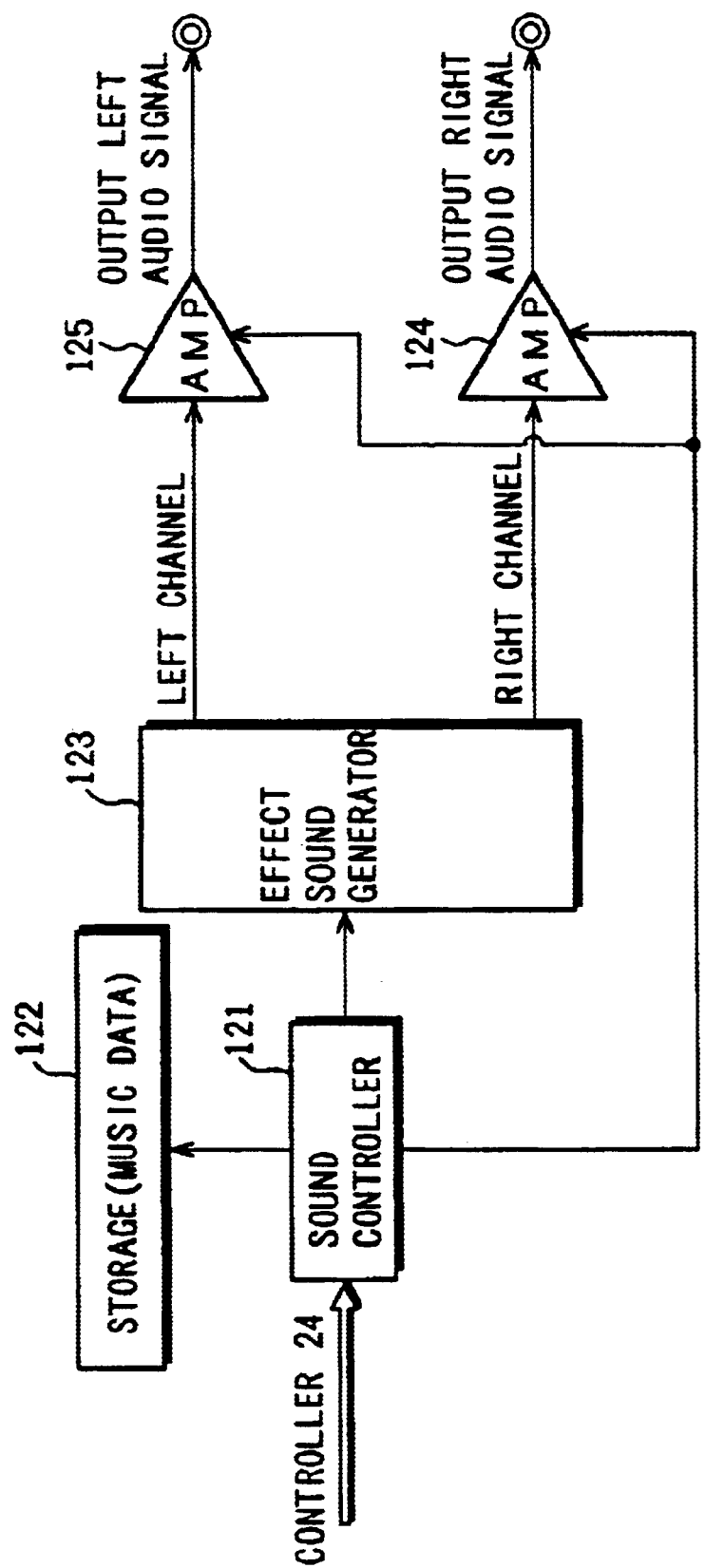
FIG. 7 is a circuit construction diagram of a sound generating unit.

A sound generating unit 12 generates the effect sounds, and includes a sound controller 121, a storage 122, an effect sound generator 123 and audio amplifiers 124, 125 as shown in FIG. 7.

The sound controller 121 performs controls concerning the effect sounds such as selection of BGM, start and stop of music, and a volume adjustment in accordance with a control signal from the controller 24. The storage 122 is a memory in which preselected BGM songs are stored. The effect sound generator 123 generates a stereo music, and the audio amplifiers 124, 125 amplify the right and left channels of the generated music to a specified volume.

The controller 24 inputs control data such as a song number in the storage 122, music start and stop timings and a volume to the sound controller 121 during the reproduction of the film image. The sound controller 121 controls the storage 122, the effect sound generator 123 and the audio amplifiers 124, 125 based on the control data.

More specifically, the sound controller 121 reads a digital audio data of the song number designated by the storage 122, and stops reading this digital audio data at the music stop timing. The sound controller 121 also adjusts gains of the audio amplifiers 124, 125 based on the volume data input from the controller 24. The read digital audio data is converted into an analog audio signal in the effect sound generator 123, and output to the monitor TV 2 after having its level adjusted to a specified volume level in the audio amplifiers 124, 125.

Although the effect sounds of stereo type are output in this embodiment, those of monaural type may be output.

Referring back to FIG. 6, an image pickup device 13 is adapted to pick up the film image of each frame F of the film 8. The device 13 includes a light source for illuminating the film 8, and a color image sensor including three CCD line image sensors provided with color filters of R, G, B. The color image sensor is relatively moved in a film feed direction with respect to the film 8 illuminated by the light source with a specified light amount to read the image data of each frame F.

The reading of the image data is performed during the prescanning and during the reproduction of the film image (hereafter, main scanning). The image data obtained during the prescanning is used for the calculation of an exposure value and an automatic white balance control value during the main scanning and for an index display.

The calculation of the exposure value and the automatic white balance control value (hereafter, AE/AWB control calculation) is made using a part of the film image data. The index display is such that the film images of all frames are display in a two-dimensional arrangement on the display screen 3 of the monitor TV 2. Since the film images in the two-dimensional arrangement are reduced in size, the image data having less number of data than those obtained during the main scanning (images of lower density that the reproduced images) are used.

An exposure control of the image pickup device 13 is performed using a preset initial value during the prescanning, whereas it is performed based on the exposure control value calculated by the AE/AWB control calculation during the main scanning.

An image processor 14 applies, to the image data read by the image pickup device 13, a specified image processing such as a white balance correction, a shading correction, a negative/positive inversion (in the case of a negative film), or a γ-correction. While the image data are read during the prescanning, the white balance of the image data is corrected based on a preset automatic white balance (AWB) control value. While the image data are read during the main scanning, the white balance of the image data is corrected based on the AWB control value calculated in the AE/AWB calculation.

An image memory 15 stores the image data picked up by the image pickup device 13. The image memory 15 has a storage capacity of one frame. During the prescanning, the image data of all frames are stored in the image memory 15 after being converted into an image data of an index display image (an image in which the film images of the respective frames are arranged in a two-dimensional array). During the main scanning, only one frame of image data to be reproduced is stored in the image memory 15.

A display area designating device 16 designates a read area of the image data in the image memory 15. The film image is reproduced on the monitor TV 2 by transferring the film image data stored in the image memory 15 to a display memory 20 to be described below. The image displayed on the monitor TV 2 is changed by transferring a new image data from the image memory 15 to the display memory 20.

For example, the animated display by panning/tilting is made by moving the display area of the film image in a specified cycle and transferring the data in the display area after the movement to the display memory 20. The animated display by zooming-up/down is made by changing the magnification of the film image in the display area in a specified cycle and transferring the data after the magnification change to the display area 20.

A cycle τ in which the display area is moved or the magnification of the image is changed is measured using a cycle τv (=1/60 sec.) of a vertical synchronization signal of the monitor TV 2, and there is a relationship: τ=n·τv. More specifically, the image is displayed in an animated manner on the monitor TV 2 by renewably displaying frame images (still images) in a cycle τv. The animated display is made by transferring an image data having a content different from that of the presently displayed image every n frames from the image memory 15 to the display memory 20 and changing the content of the frame image.

The display area designating device 16 designates a read area of the data corresponding to the display area in the storage area of the image memory 15.

For example, when the zoom key 57 or panning/tilting key 58 is operated, the controller 24 inputs a control signal corresponding to the key operation to the display area designating device 16, which in turn generates an address data of the read area of the image data in accordance with the received control signal and outputs it to the image memory 15.

Figure 10:
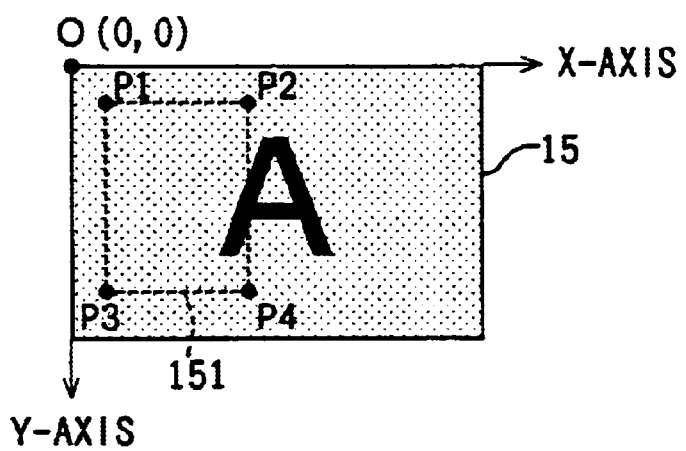
FIG. 10 is a diagram of xy coordinate systems set in an image memory.

If xy coordinate systems are set whose origin O (0, 0) is at the upper left corner of the memory area of the image memory 15 as shown in FIG. 10, upon the designation of a read area 151, the designating device 16 outputs, to the image memory 15, address data (xy coordinate data) of four corner positions P1 to P4 of the area 151 or two end positions P1, P3 (or P2, P4) on a diagonal line.

In the case that the film image is displayed in a display format changed based on the format information as shown in FIGS. 8 and 9, the controller 24 outputs a control signal for the display format to the display area designating device 16, which in turn generates an address data of a preset read area corresponding to the display format in accordance with the received control signal and outputs it to the image memory 15.

A rotating/magnification changing device 17 transfers the image data read from the image memory 15 after rotating it or changing its magnification.

The image data is rotated when the orientation of the image data stored in the image memory 15 differs from those of the display screen 3 of the monitor TV 2. By writing the image data in the display memory 20 while rotating it, the image can be displayed so that the orientation of the pick-up image correspond with those of the display screen 3 of the monitor TV 2.

Figure 11:
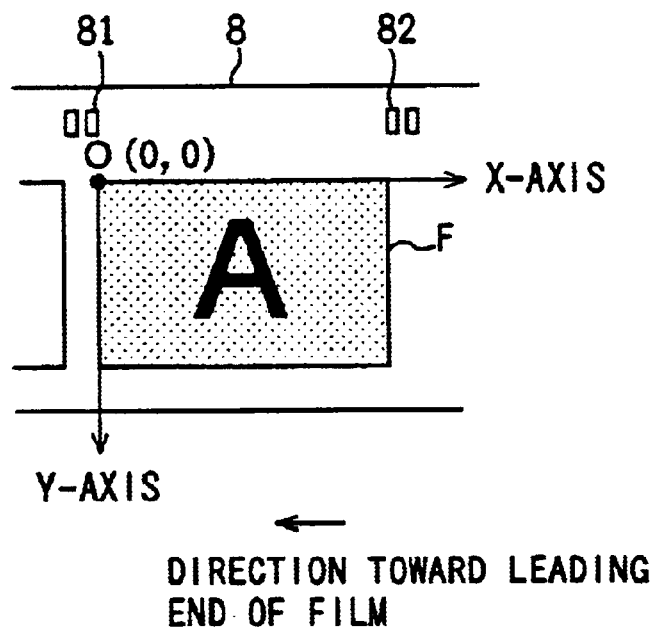
FIG. 11 is a diagram of XY coordinate systems set in the film image.

If XY coordinate systems having an origin O(0, 0) at an upper corner corresponding to the perforation 81 are set in the film image of each frame F as shown in FIG. 11, the image data of each frame read during the main scanning is stored so that the XY coordinate systems of the film image correspond with the xy coordinate systems of the image memory 15. More specifically, if the X-axis of the film image ("A" in FIG. 11) is assumed to be the "top" side of the image, the image data is recorded such that the "top" side of the pick-up image corresponds with the x-axis of the image memory 15.

Figure 12:
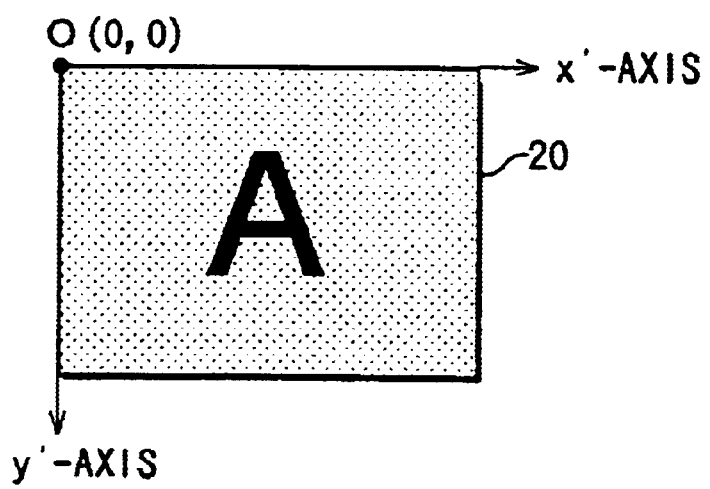
FIG. 12 is a diagram of x'y' coordinate systems set in a display memory.
Figure 13:
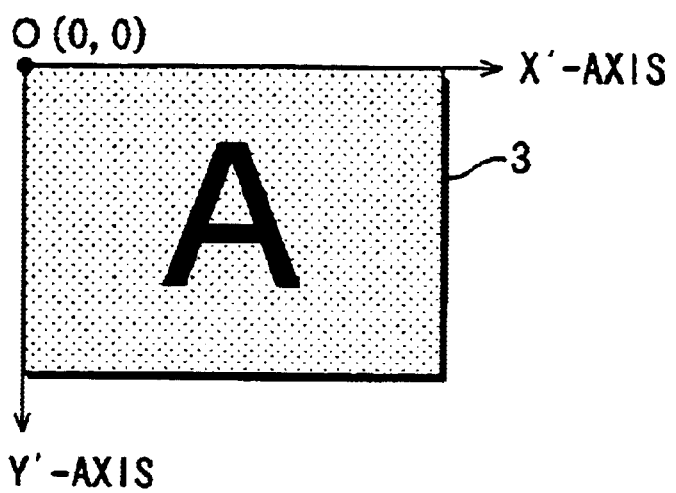
FIG. 13 is a diagram of X'Y' coordinate systems set on a display screen of the monitor TV.

On the other hand, the display memory 20 is adapted to store the image data to be displayed on the monitor TV 2 to be described later. If x'y' coordinate systems having an original O(0, 0) in an upper left corner position are set in the display memory 20 as shown in FIG. 12 and X'Y' coordinate systems having an original O(0, 0) in an upper left corner position are set in the display screen 3 of the monitor TV 2 as shown in FIG. 13, the image data stored in the display memory 20 is reproduced such that the x'y' coordinate systems of the display memory 20 correspond with the X'Y' coordinate systems of the display screen 3.

Figure 14:
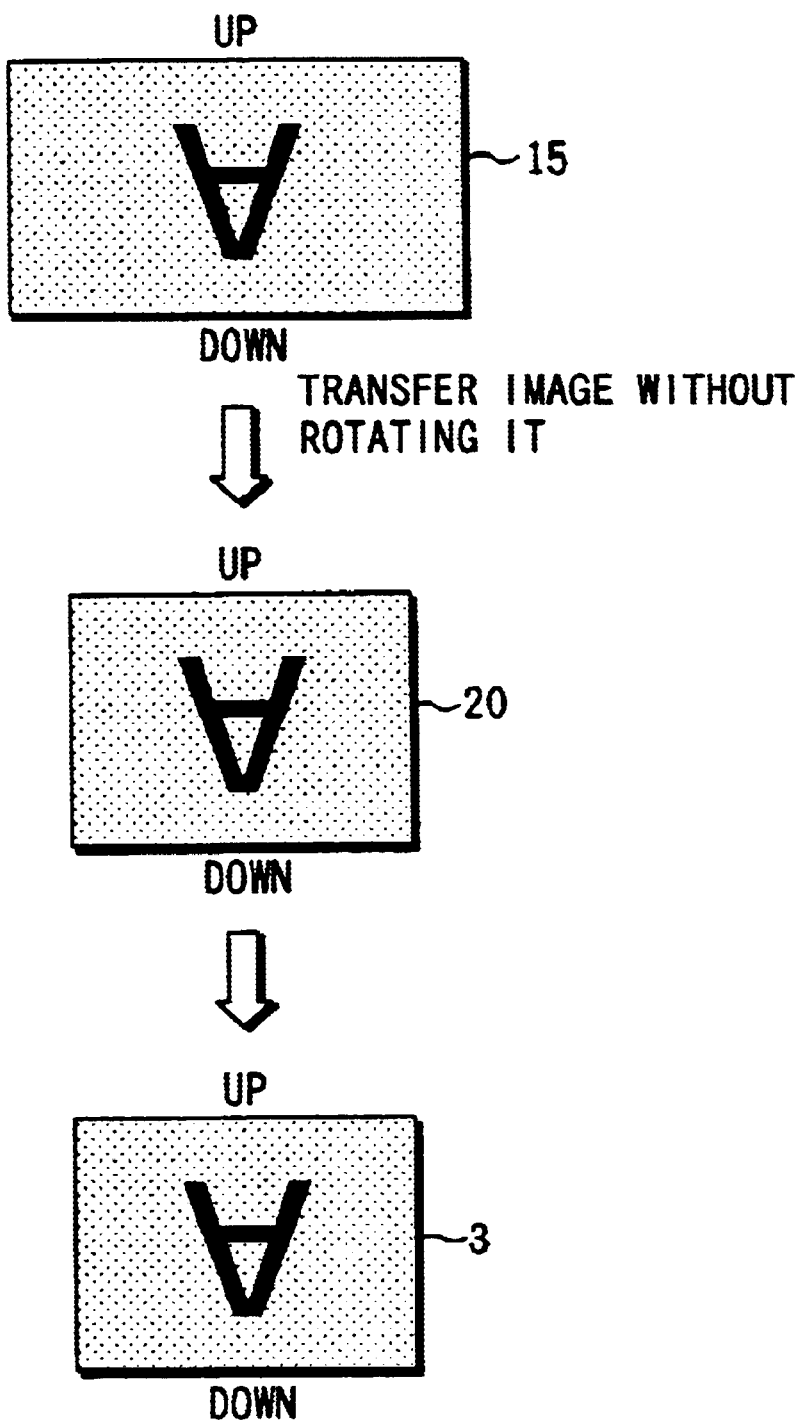
FIG. 14 is a diagram showing a process of the reproduction of an inverted film image when a rotation processing is not applied.

Accordingly, if the image data in the image memory 15 is transferred as it is to the display memory 20 when, for example, the film image is an inverted image, the image reproduced on the display screen 3 is also an inverted image as shown in FIG. 14. In this embodiment, if the film image is not right way up, the image data read from the image memory 15 is transferred to the display memory 20 after having rotated by a specified amount by the rotating/magnification changing device 17 based on the orientation information of this frame so as to orient the image right way up. Therefore, the erect images are constantly displayed on the display screen 3 of the monitor TV 2.

The magnification of the image data is changed in order to enhance the effect of the animated display of the images by zooming-up and zooming-down. The animated display by zooming is made by reading the image data from the read area of the image memory 15 in a specified change cycle τ while enlarging (or reducing) the image in the read area, and transferring the read image to the display memory 20 after applying a data processing to it based on the magnification β set by the rotating/magnification changing device 17.

A background data device 18 includes a memory for storing a plurality of predetermined background patterns, and outputs the background pattern designated by the controller 24 to a data switching device 19.

When the size of the display image differs from that of the display screen 3 of the monitor TV 2 or the animated display is made, a blank margin area is seen on the display screen 3. The above background data is used to decorate this margin area (hereafter, "background area").

For example, FIG. 16 shows a background area seen when the entire film image of high vision size is displayed on the display screen 3 of standard size. Strip-like background areas AR3, AR4 are seen at upper and lower sides of the display screen 3.

Figure 17:
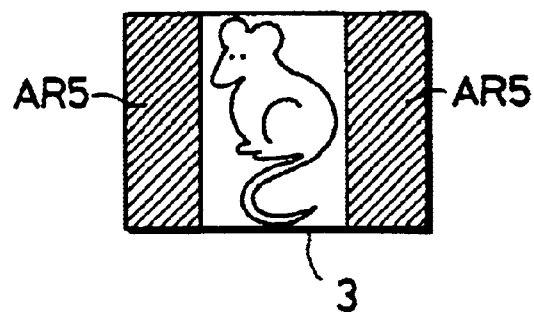
FIG. 17 is a diagram of a displayed image in which a background area is created at the left and right sides of the display screen because of an insufficient magnification in a horizontal direction.
Figure 18:
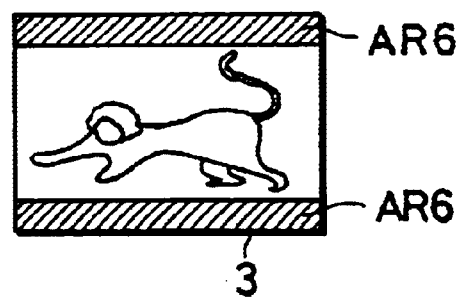
FIG. 18 is a diagram of a displayed image in which a background area is created at the top and bottom sides of the display screen because of an insufficient magnification in a vertical direction.
Figure 19:
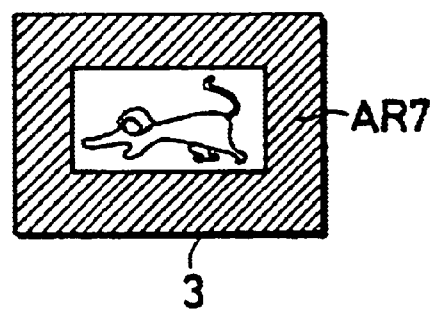
FIG. 19 is a diagram of a displayed image in which a background area is created at the periphery of the display screen because of an insufficient magnification in both horizontal and vertical directions.

FIGS. 17 to 19 show background areas seen when the image data read from the read area of the image memory 15 is insufficiently magnified along the horizontal and/or vertical direction. In FIG. 17, the magnification is insufficient along the horizontal direction and, therefore, a strip-like background areas AR5 are seen at left and right sides of the display screen 3. In FIG. 18, the magnification is insufficient along the vertical direction and, therefore, a strip-like background areas AR6 are seen at upper and lower sides of the display screen 3. In FIG. 19, the magnification is insufficient along both horizontal and vertical directions and, therefore, a background area AR7 is seen at a periphery portion of the display screen 3.

FIGS. 20A to 20B show a background area AR8 seen when an animated display is made by scroll-in/scroll-out.

Figure 21:
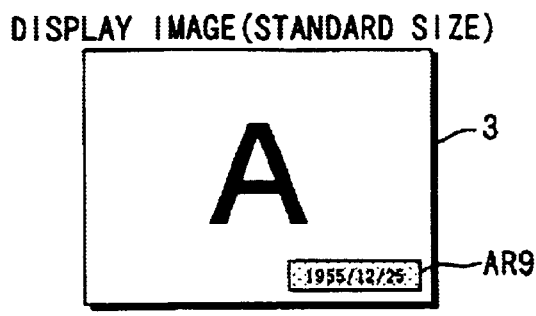
FIG. 21 is a diagram of a character image provided with a background portion so that the displayed character image can be more easily seen by making the contrast of the background portion and the character image higher.

The background data is also used to decorate a background area AR9 provided for characters as shown in FIG. 21. By using the background data in the background area AR9, the contrast between the background area AR9 and the characters can be made more distinguishable, with the result that the character display can be easily seen.

Referring back to FIG. 6, the data switching device 19 is adapted to switchingly connect the display memory 20 with the rotating/magnification changing device 17 and with the background data device 18. When the display image is going to have a background area, the data switching device 19 switchingly connects the display memory 20 with the rotating/magnification changing device 17 and with the background data device 18. By transferring the image data output from the device 17 and the background data output from the device 18 to the display memory 20, an image data to be displayed can be generated in which the background data and the image data are combined.

Figure 22:
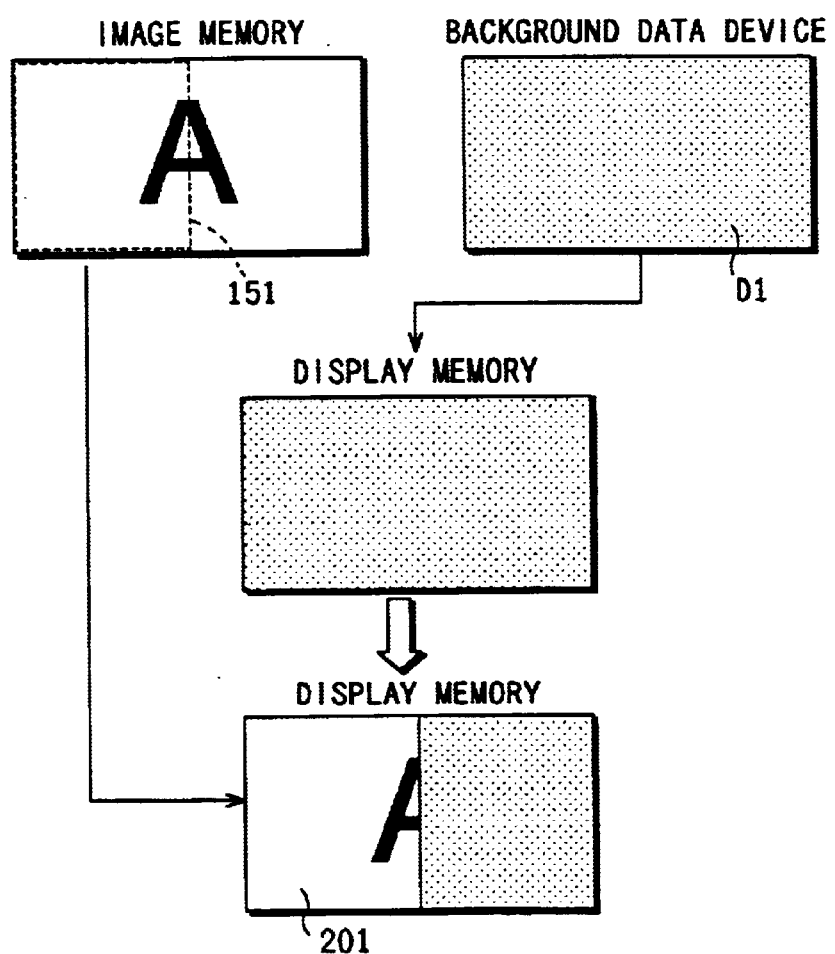
FIG. 22 is a diagram showing a method of combining a background data and an image data.

More specifically, the data switching device 19 first connects the background data device 18 with the display memory 20 in accordance with a control signal from the controller 24 so as to write a background data D1 in the entire display memory 20 as shown in FIG. 22, and then connects the display memory 20 with the rotating/magnification changing device 17 to overwrite the image data in the read area 151 of the image memory 15 in a write area 201 of the display memory 20, thereby generating the image data to be displayed.

When a background area is seen on the display screen 3, the atmosphere and the easiness to see the image largely differ depending upon the contrast between the displayed image and the background area. Accordingly, it is preferable to decide the color and pattern of the background area in view of the content of the displayed image.

For example, if the color of an image of the nature is averaged, it generally has neutral tints. Accordingly, stability can be given by painting out the background area by gray.

Further, colors are extracted from several positions of an image to be displayed, and the background area is painted out by a complementary color of a color obtained by averaging the extracted colors at a relatively low luminance. By doing this, since the background of the displayed image is colored by the complementary color even if the color of the display image is monotonous when only a part of the film image is displayed, a vivid and clear impression can be given to a viewer.

An average color of the entire film image may be calculated based on the image data read during the prescanning, and a complementary color of this average color may be used for the background area. In such a case, an average color of the display image may be calculated, instead of the average color of the entire film image. By doing this, a sampling range can be narrowed, thereby making the calculation of the average color easier. As a result, the color of the background data can be easily decided.

Further, in the case that the percentage of a skin color in the displayed image is large such as in an image of a person, the displayed image can be made stand out by coloring the background area by a complementary color of the skin color.

Figure 23:
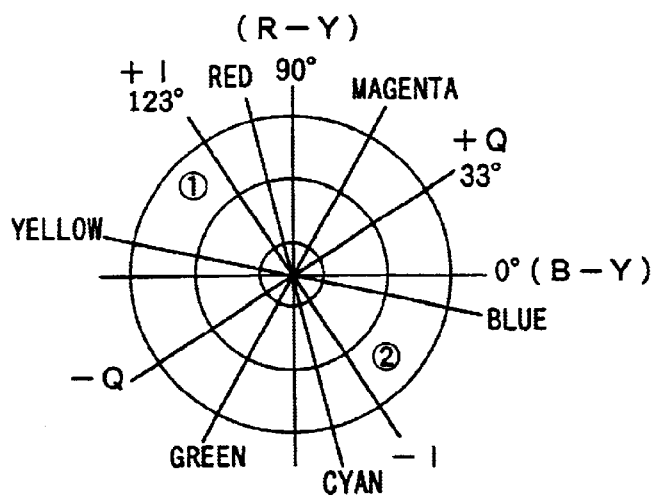
FIG. 23 is a diagram showing I- and Q-axes in a color plane.

In the case that a color image is displayed in NTSC system as in a monitor television, a color signal can be represented by color difference signals (R-Y), (B-Y) or an I-signal and a Q-signal generated from these color difference signals. The color difference signals (R-Y), (B-Y), the I-signal and the Q-signal have a positional relationship as shown in FIG. 23 in a color plane (a plane view of a color solid). Since the color of the human skin is generally distributed in proximity to a +I-axis (1), the background area is colored by a color on a −I-axis (2) having a complementary relationship with the +I-axis (1).

In the case that the monitor TV 2 includes a CRT, the luminance and the color of the entire display 3 screen tend to be averaged. Accordingly, the skin color can be more vividly reproduced by coloring the background area by a complementary color of the skin color.

Further, in the case that the distribution of the luminance of the display image is skewed toward the low side (the image has a low density), the luminance of the background area is set high. This prevents the luminance of the entire displayed image from undesirably rising due to a clamping error at the monitor TV 2.

Further, the density of the background area may be gradually changed. For example, the density may be invariable along the horizontal direction of the display screen 3, but variable along the vertical direction (e.g., from the upper side to the lower side).

Figure 24:
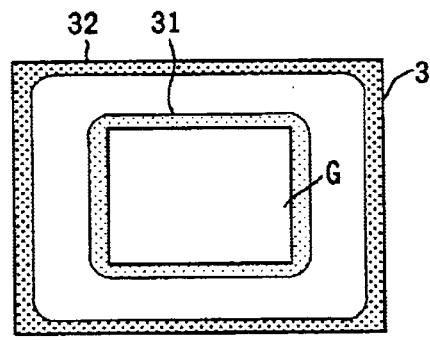
FIG. 24 is a diagram showing a first example of a background coloring method of coloring the background area at different densities.

For example, in the case of zoom-up, the density gradation may be such that an area 31 near a frame of a display image G has a lower density, and an area 32 near a frame of the display screen 3 has a higher density as shown in FIG. 24.

Further, the display screen 3 may be divided into a plurality of areas by a plurality of straight lines passing through the center of the display screen 3. A circumferential center portion of the background area within each divisional area (a portion substantially on a center line of each area) may be colored by a complementary color of an average color in a peripheral portion of the display image, and the color of the background area may be gradually changed toward the boundaries with the neighboring divisional areas.

Figure 25:
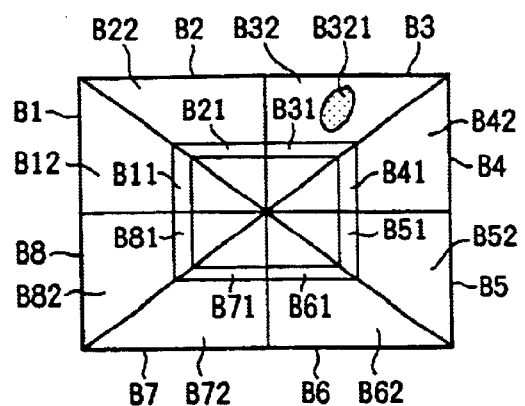
FIG. 25 is a diagram showing a second example of a background coloring method of coloring the background area at different densities.

For example, in FIG. 25, average colors of peripheral portions B11 to B81 of the display image are calculated for the respective divisional areas B1 to B8, and the center portions of background areas B12 to B82 of the divisional areas B1 to B8 are colored by complementary colors of the calculated average colors. The colors of the respective background areas B12 to B82 are smoothly changed toward the boundaries of the neighboring divisional areas so that the gradation of the colors of the background areas looks continuous at the boundaries. For example, in the background area B32, a center portion B321 is colored by a complementary color of an average color of the peripheral portion B31 of the displayed image, and this complementary color is smoothly changed along directions of arrows.

Figure 26:
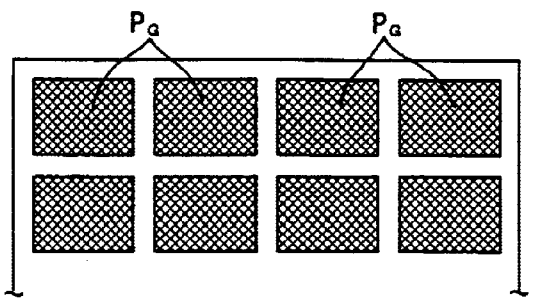
FIG. 26 is a diagram of pattern images.

Further, in the case that the monitor TV 2 is a LCD (liquid crystal display) or like display device comprised of m×n pixels, preset pattern images PG made up of i×j pixels (i<m, j<n) as shown in FIG. 26 may be used as a background data.

Figure 27:
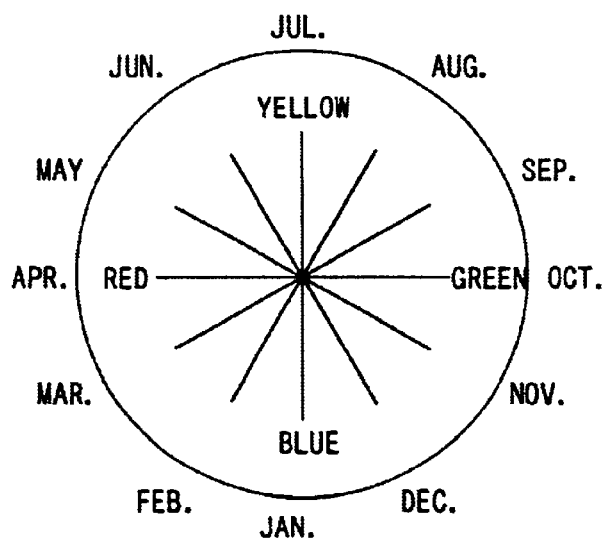
FIG. 27 is a hue circle in which representative colors are allotted to months of photographing.

The above examples are proposed in view of the reproducibility and visibility of the color of the display image, but the color of the background area may be used as a certain information. For example, the color of the background area may correspond to the season when the image was photographed. FIG. 27 shows a hue circle of 12 colors which correspond to the 15th of each calendar month. The color of the background area is determined based on the date of photographing of each frame in accordance with the hue circle.

According to this method, if the background areas are produced during the reproduction of a group of frames of images photographed, for example, in July, the background areas of the displayed images corresponding to the respective frames are colored by yellowish colors, and the color of the background areas gradually changes according to the date of photographing. Thus, a change in the date of photographing can be known based on the color of the background area.

Further, in the case that a group of frames are continuously displayed in the automatic reproduction mode, the number of display frames may be indicated by the color of the background area.

Figure 28:
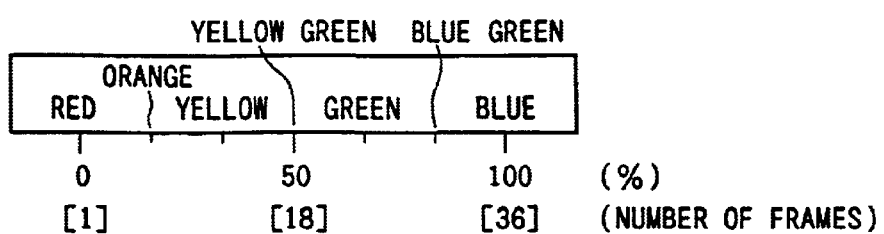
FIG. 28 is a display scale employing a spectral distribution of colors.

FIG. 28 shows a display scale in which the percentage of the number of the display frames is allocated in a spectral array of red to blue. For example, in the case that 36 frames of film images are continuously displayed, the color of the background area in the first frame is red, and it gradually changes from red, orange, yellow, yellow green, . . . as the number of the display images increases. The color of the background area is blue in the last or 36th frame. According to this method, the number of already displayed frames can be roughly known based on the color of the background area.

Referring back to FIG. 6, the display memory 20 is adapted to store the image data to be displayed on the monitor TV 2. A write area designating device 21 designates a write position where the image data is written in the display memory 20. In accordance with a control signal from the controller 24, the designating device 21 generates the x'y' coordinate systems indicative of the write area in the display memory 20 where the image data is written, and outputs it to the display memory 20.

An image output device 22 converts the image data written in the display memory 20 into, e.g. a TV signal of NTSC system in order to output it to the monitor TV 2. The image output device 22 also adjusts an output gain in accordance with a control signal from the controller 24 to add an image effect such as fader and overlapping, and superimposes a character information such as a date of photographing input from a character data device 23 on the image data to be displayed.

The character data device 23 generates a character information to be displayed with the image. For example, the character information such as the date of photographing of each frame and the frame number during the prescanning, the frame number and a cursor symbol for editing in an index display, and the frame number of frame to be reproduced and the date of photographing during the reproduction is displayed on the display screen 3 with the image. The character data device 23 converts the character information input from the controller 24 into a character data to be output to the image output device 22.

The controller 24 centrally controls the operation of the film image reproducing apparatus 1. The controller 24 controllably drives the film information reader 9, the image pickup device 10, the sound generating unit 12, the display area designating device 16, the rotating/magnification changing device 17, the background data device 18, the data switching device 19, the write area designating device 21, the image output device 22, the character data device 23 and the like to reproduce and display the film images.

Next, a control by the controller 24 to perform a film image reproduction processing is specifically described with reference to flowcharts.

Figure 29:
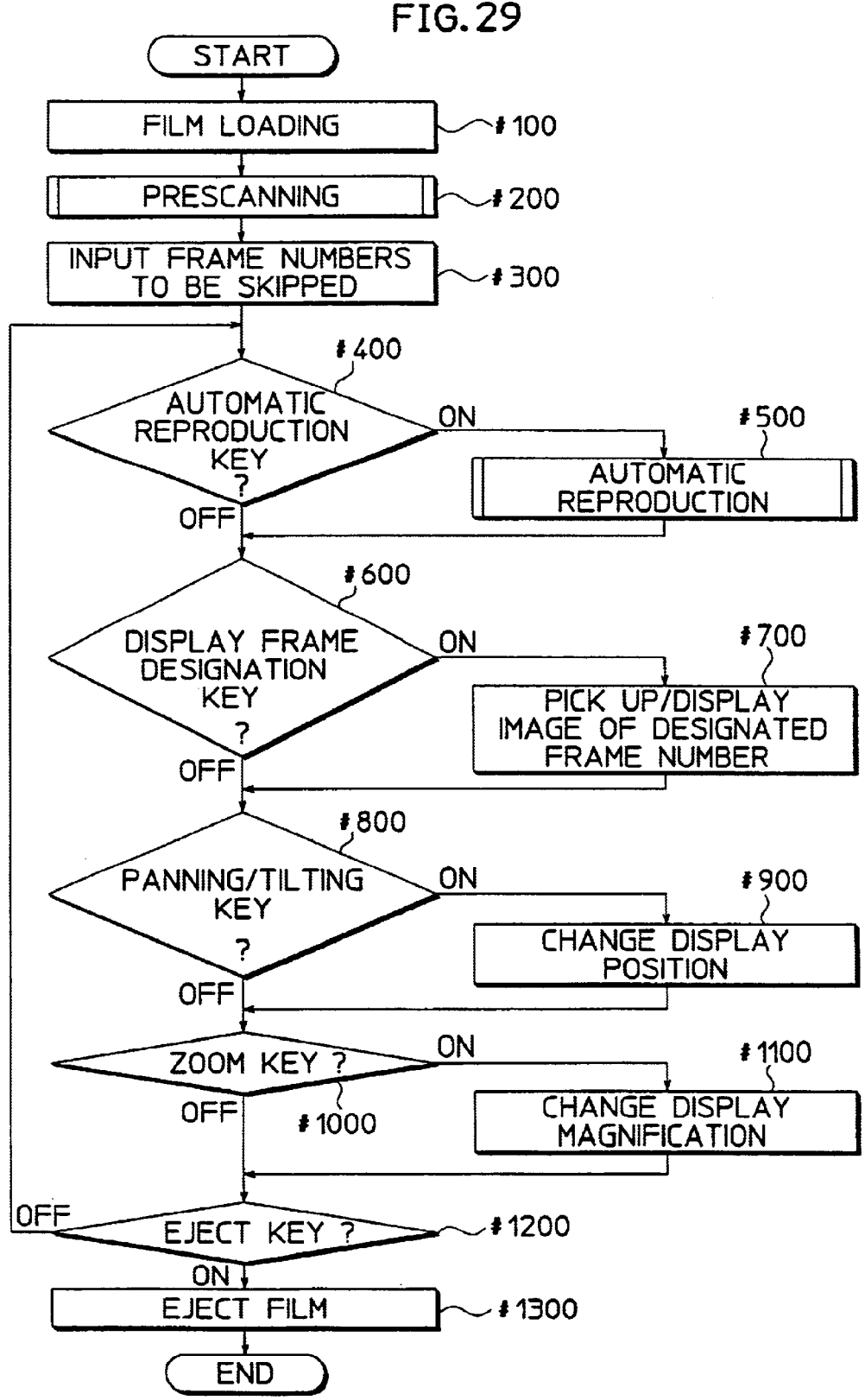
FIG. 29 is a main flowchart of a film image reproduction processing.

FIG. 29 is a main flowchart for the control of the film image reproduction processing.

Figure 30:
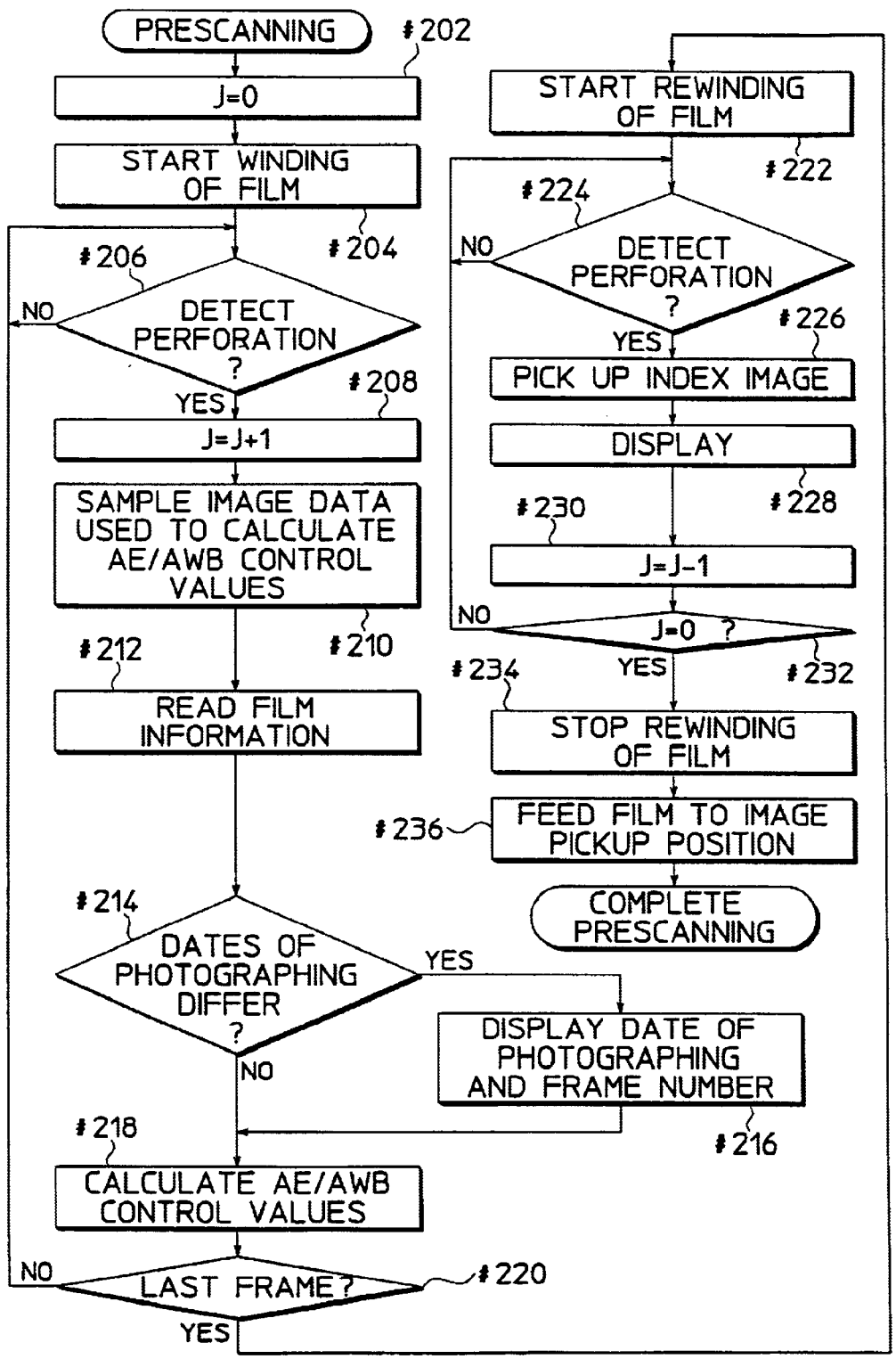
FIG. 30 is a flowchart showing a subroutine "Prescanning"

When the film cartridge 7 is set in the film loader in the film image reproducing apparatus 1 by the eject table 6, film loading is automatically performed (Step #100). More specifically, the film 8 is taken out of the film cartridge 7 by rotating a spool shaft of the film cartridge 7 and fed until its leading end reaches a film take-up shaft. Upon the completion of the film loading, a subroutine "Prescanning" shown in FIG. 30 is implemented (Step #200).

The "Prescanning" is performed to set the exposure control value to be used during the main scanning and to make the index display to set the presentation conditions. During the prescanning, the film 8 is wound to read the magnetic information of the respective frames and the image data thereof used to calculate the AE/AWB control values, and then is rewound to read the image data of the respective frames used for the index display, and the index display for the read images (reduced images) is made.

Upon entering the subroutine "Prescanning", a counter J for counting the frame number is reset to "0" (Step #202), and the winding of the film 8 is started (Step #204). At this stage, the film 8 is wound at a speed faster than the film feeding speed during the main scanning.

When the film 8 is wound until the perforation 81 indicative of the front end position of the leading frame is detected (YES in Step #206), the count value of the counter J is incremented by 1 (Step #208). While the film image of the leading frame is scanned, the image data used to calculate the AE/AWB control values is sampled in a specified cycle by the image pickup device 13 (Step #210). Further, the magnetic information is read by the film information reader 9 from the magnetic recording portions 87A, 87B corresponding to the leading frame, and are stored in the film information storage 10 (Step #212).

The sampling of the image data used to calculate the AE/AWB control values and the reading of the magnetic information are performed at specified timings on the basis of a detection timing of the perforation 81.

Subsequently, the information on the date of photographing is extracted out of the read magnetic information, and it is discriminated whether this date of photographing is identical to that of the previous frame (Step #214). If the dates of photographing differ (YES in Step #214), a content "Date of Photographing+Frame Number" is displayed on the display screen 3 of the monitor TV 2 (Step #216). Subsequently, the reading level of the image data during the main scanning is calculated based on the image data sampled for the calculation of the AE/AWB control values (Step #218). On the other hand, if the dates of photographing are identical (NO in Step #214), the exposure control value of the image data during the main scanning is calculated without making any display (Step #218)

For the leading frame, its date of photographing is compared with a date which cannot exist so as to differentiate two dates of photographing, and a content "Date of Photographing+Frame Number (No. 1)" is displayed on the display screen 3 of the monitor TV 2.

Subsequently, it is discriminated whether the last frame has been reached based on the count value of the counter J (Step #220). When the film cartridge 7 is loaded, the information on the number of photographed images contained in the film 8 is detected from the film cartridge 7. The above discrimination is made by comparing the count value of the counter J with the number of photographed images.

Unless the last frame has been reached (NO in Step #220), this subroutine returns to Step #206 and the operations same as above are performed for the next frame. Since the above operations were performed for the leading frame, the last frame has not been reached. Thus, the subroutine returns to Step #206, and the same operations are performed for the second and subsequent frames. When the last frame is reached (YES in Step #220), Step #222 follows in which the winding of the film 8 is stopped and instead the rewinding thereof is started.

When the film 8 is rewound until the perforation 82 indicative of the rear end position of the last frame (YES in Step #224), an image data of this last frame used for the index display (hereinafter, "index image data") is read (Step #226). The index image data is read by intermittently scanning the film 8 toward the leading end thereof on the basis of a detection timing of the perforation 82. The index image data is read using the exposure control value calculated in Step #218.

The read index image data is written in a specified position of a storage area of the image memory 15 after a specified image processing is applied thereto in the image processor 14. In this way, the index image data is stored in the image memory 15. The index image data is immediately transferred to the display memory 20 via the rotating/magnification changing device 17 and the data switching device 19, and output to the monitor TV 2 via the image output device 22 to be displayed on the display screen 3 (Step #228).

Subsequently, after the count value of the counter J is decremented by 1 (Step #230), it is discriminated whether the count value is "0", i.e. whether the index image includes the image of the leading frame (Step #232). Unless J=0, this subroutine returns to Step #224 and the index display is made for the next frame. Thereafter, the reading of the index image data of the respective frames and the index display including the presently read index image data are alternately performed to the leading frame. When the index display including all images is displayed (YES in Step #232), the rewinding of the film 8 is stopped (Step #234).

After the film 8 is fed until the frame having the first photographed image reaches an image pickup position (Step #236), the prescanning ends.

The film 8 is fed until the frame having the first photographed image reaches the image pickup position for the following reason. Normally, the images are often reproduced in the chronological order of photographing during the film image reproduction processing. Accordingly, the frame having the first photographed image is set in the position where it is picked up by the color image sensor of the image pickup 13 so that the image data of the first frame can be rapidly read during the main scanning.

FIGS. 31A to 31D show exemplary displays to be made on the monitor TV 2 during the prescanning.

There are two kinds of photographing methods of cameras: a normal wind method according to which images are recorded from the leading frame to the last frame, and a prewind method according to which images are recorded from the last frame to the leading frame. The display examples of FIGS. 31A to 31D are for the film photographed according to the normal wind method.

In the description below, the film photographed according to the normal wind method and the film photographed according the prewind method are referred to as a normal wind type film and a prewind type film, respectively.

Figure 31A:
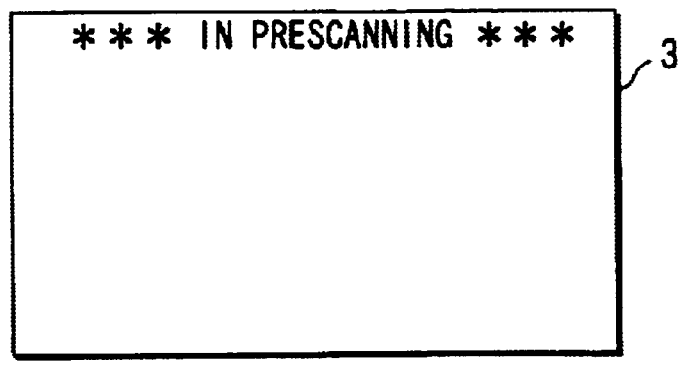
FIGS. 31A to 31D are diagrams showing examples of display on the monitor TV during prescanning.

FIG. 31A shows an exemplary display made on the monitor TV 2 until the magnetic information of the first frame is read. Since neither the magnetic information nor the image information is read during this period, only a message "Prescanning" is blinkingly displayed to inform a user that the prescanning is presently performed.

Figure 31B:
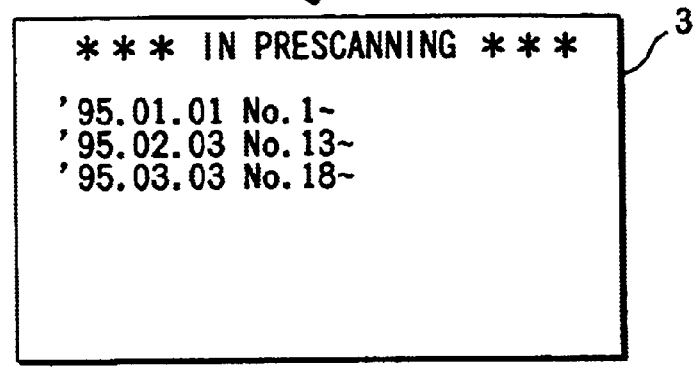

FIG. 31B shows an exemplary display made on the monitor TV 2 to display the magnetic information of the respective frames read during the winding of the film 8, and corresponds to the operation in Step #216. In each row, a date of photographing is followed by a range of frame numbers corresponding to this date of photographing. In this example, assuming that 24 photographed images are recorded in the film 8, the images of the frames No. 1 to No. 12 are photographed on Jan. 1, 1995, those of the frames No. 13 to No. 17 on Feb. 3, 1995, and those of the frames No. 18 to No. 24 on March 3.

Figure 31C:
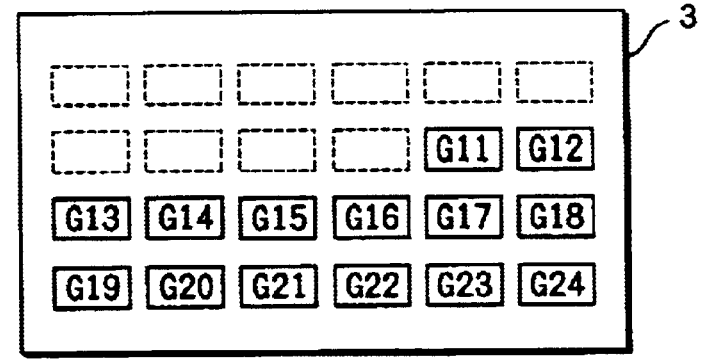
Figure 31D:
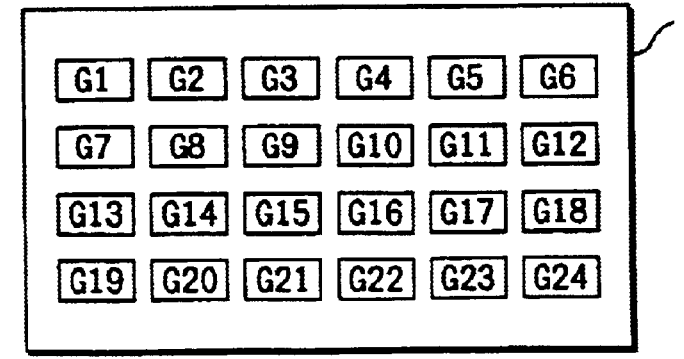

FIG. 31C shows an exemplary index display of the read images during the rewinding of the film 8, and FIG. 31D shows an exemplary index display upon the completion of the rewinding of the film 8.

The index image data of the respective frames are arrayed in a (4×6) matrix so that the film images G1, G2, ... G24 corresponding to the frame numbers No. 1, No. 2, ... No. 24 are placed in display positions (1, 1), (1, 2), ... (4, 6), respectively.

In the case of the film 8 of normal wind type, the index image data are read in the decreasing order from frame number No. 24 (from the frame having the latest photographed image to the frame having the oldest photographed image). Accordingly, in the index display made during the rewinding of this film 8, the film images G24, G23, ... corresponding to the frame numbers No. 24, No. 23 are displayed in the reverse direction from the display position (4, 6).

FIG. 31C shows a state where the images corresponding to the frame numbers No. 24 to No. 11 are seen in the index display. Upon the completion of the rewinding of the film 8, the images of all frames for the index display are displayed on the display screen 3 of the monitor TV 2. Editing of the presentation method is first possible in this display state.

In the case of the film 8 of prewind type, the index image data are read in the increasing order from frame number No. 1 (from the frame having the oldest photographed image to the frame having the latest photographed image). Accordingly, in the index display made during the rewinding of this film 8, the film images G1, G2, ... corresponding to the frame numbers No. 1, No. 2 are displayed in the forward direction from the display position (1, 1).

Referring back to FIG. 29, upon the completion of the prescanning, a skip frame input mode is entered. At this time, a cursor is superimposed on the index display of all frames on the display screen 3 of the monitor TV 2. This cursor enables the user to input the frame numbers to be skipped (Step #300).

When the user moves the cursor to the image of the frame to be skipped by using direction keys 58a to 58d of the panning/tilting key 58 of the remote controller 5 and pressing the skip key 55 to designate the frame to be skipped, this frame number is discriminated based on the position information of the cursor in the display image 20, and this discrimination result is stored in the memory built in the controller 24. Further, in order to save a labor to redesignate the same frame from the next reproduction on, the number of the designated frame to be skipped is recorded in the corresponding magnetic recording portion 87 of the film 8 when the film 8 is rewound into the film cartridge.

Upon the completion of the designation of the skip frame, discriminations as to whether the automatic reproduction key 56, the display frame designation key 54, the panning/tilting key 58, the zoom key 57 and the eject key 52 have been operated are made in this order (Steps #400, #600, #800, #1000, and #1200).

If none of the keys has been operated, this routine waits on standby until any of them is operated (a loop of Steps #400, #600, #800, #1000, and #1200).

If the automatic reproduction key 56 is operated (ON in Step #400), the film images of all frames excluding the skip frame(s) are automatically reproduced (Step #500).

In the automatic reproduction, the presentation conditions including the display method, the image switch method, and the character information display are automatically set based on the film information of the respective frames to be reproduced, and the BGM as effect sounds is decided so as to automatically reproduce the film images of the respective frames to the BGM. The automatic reproduction is controlled in accordance with a flowchart shown in FIG. 32.

Upon entering a subroutine "Automatic Reproduction", a presentation method used to continuously display the frames to be reproduced is calculated (Step #502). In this calculation, the frames to be reproduced are divided into a plurality of blocks based on the magnetic information thereof such as the date and time of photographing, and a song of the BGM to be played for each block is automatically set.

A display time T during which the film image of each frame is displayed on the monitor TV 2 is set in advance at a specified time which is a multiple of a cycle τv (=1/60 sec.) of the vertical synchronization signal of the monitor TV 2. Upon the lapse of the display time T for the last frame of each block, the song to be played is switched to the one for the next block.

A method of picking up the film images of the respective frames at predetermined intervals Ti and displaying the pick-up images in succession on the monitor TV 2 may be a possible automatic reproduction method. However, according to this method, since a time Ts required to pick up the film images of the respective frames differs depending upon the kind of film (normal wind type and prewind type) and the presence or absence of the skip frame(s), the display time T (=Ti+Ts) of the film images is variable.

Figure 33:
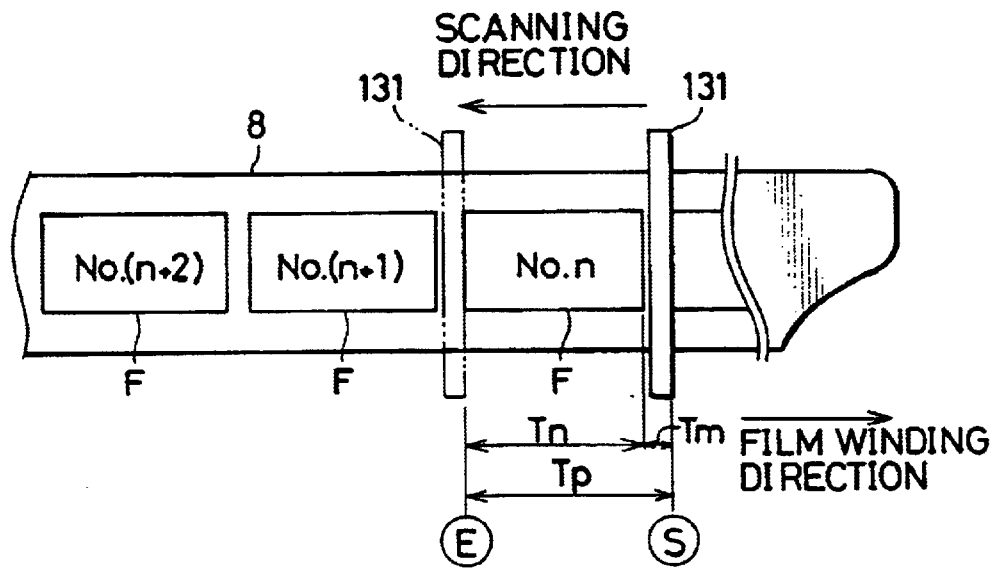
FIG. 33 is a diagram showing a time required to pick up an images of each frame of a normal wind type film.
Figure 34:
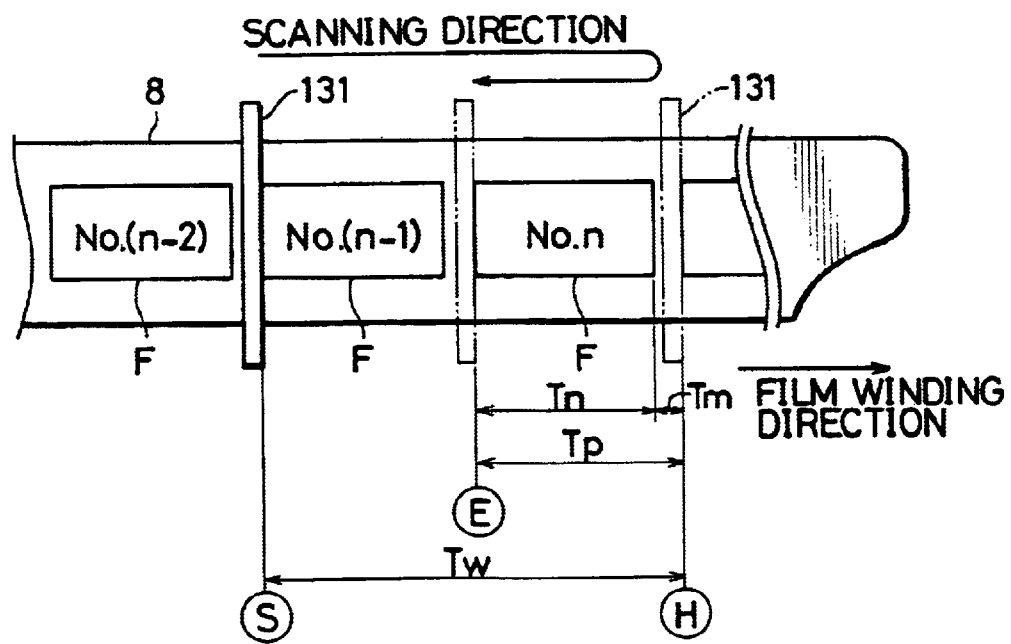
FIG. 34 is a diagram showing a time required to pick up an image of each frame of a prewind type film.

FIG. 33 is a diagram showing the time Ts required to read the image data of each frame of the film of normal wind type, and FIG. 34 is a diagram showing the time Ts required to read the image data of each frame of the film of prewind type.

In FIG. 33, position S is a movement starting position of the color image sensor 131 when the image data of the frame No. n is read, and corresponds to a scanning end position of the color image sensor 131 when the image data of the frame No. (n−1) is read. Further, position E is a scanning end position of the color image sensor 131 when the image data of the frame No. n is read.

If the film 8 is of normal wind type, the image data of the respective frames are successively read if the film 8 is fed frame by frame in the winding direction. Accordingly, the time Ts required to read the image data of the frame No. n is a sum (Tp+Tr) of a time Tp (=Tm+Tn) required for the color image sensor 131 to move from position S to position E and an extra time Tr necessary for the image pickup control. Tm denotes a time required to move the color image sensor 131 from position S to a position where the reading of the image data of the frame No. n is started, and Tn denotes a time required to read the image data of the frame No. n (time required for the main scanning).

The sequence of the frames of the prewind type film is reverse of that of the frames of the normal wind type film. Accordingly, in order to successively read the image data of the respective frames of the prewind type film, the film 8 has to be fed by one frame in the winding direction after being fed by substantially two frames in the rewinding direction.

More specifically, as shown in FIG. 34, the movement starting position S when the image data of the frame No. n is read is the scanning end position of the color image sensor 131 when the image of the frame No. (n+1) is read. Accordingly, in order to read the image data of the frame No. n, after being fed in the rewinding direction at a high speed from the position S to a position H corresponding to the movement start position S of the color image sensor 131 when the image data of the frame No. n of the normal wind type film is read and having a feed direction reversed, the film 8 has to be fed from the position H to a position E in the winding direction.

Accordingly, as compared with the normal wind type film, the prewind type film requires a longer time Ts by time Tw required to feed the film 8 from the position S to the position H in the rewinding direction: Ts=Tp+Tw+Tr.

Further, in the case that the normal wind type film has a skip frame, since the image data of the next frame is read after jumping the skip frame, the time Ts is lengthened by time Tf required for the color image sensor 131 to jump the skip frame as compared to the case where there is no skip frame.

Figure 35:
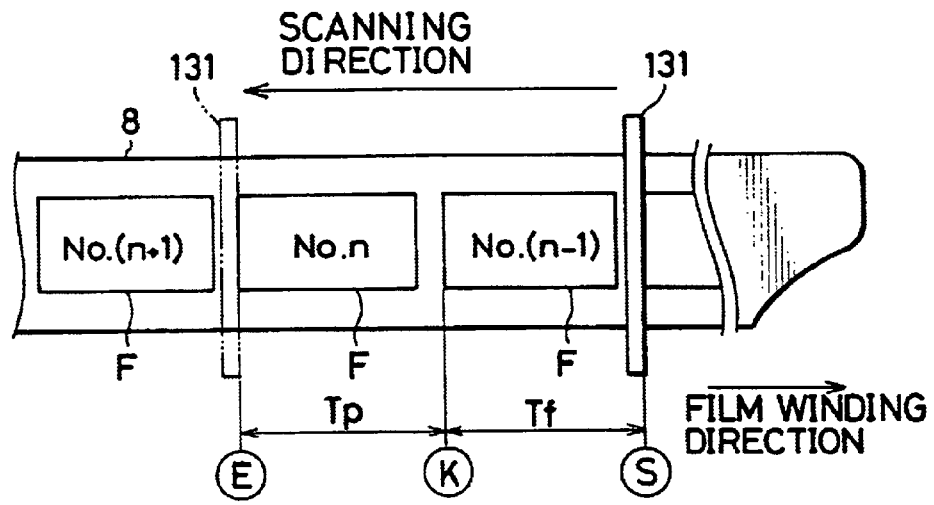
FIG. 35 is a diagram showing a time required to pick up an image recorded in a normal wind type film having a skip frame.

FIG. 35 shows the time Ts required to read the image data in the case that the normal wind type film has a skip frame. Specifically, FIG. 35 shows the time Ts required to read the image data in the case that the image data of the frame No. n is read after skipping the frame No. (n−1). Position S in this case is a scanning end position of the image data of the frame No. (n−2). Position K is a scanning end position of the image data of the frame No. (n−1) or a movement starting position of the color image sensor 131 when there is no skip frame.

Tf defined between the positions S and K is a time required for the color image sensor 131 to skip the skip frame. In order to skip the frame No. (n−1) during the time Tf, the film 8 is fed at a higher speed than when it is fed for the main scanning of the frame No. n and, accordingly, Tf<Tp. In the example of FIG. 35, since there is one skip frame, the time Ts required to read the image data is: Ts=Tp+Tr+Tf. However, if there are k skip frames, Ts=Tp+Tr+k·Tf.

On the other hand, in the case that the prewind type film has a skip frame, the time Tw required to feed the film 8 in the rewinding direction is longer as compared with the case where there is no skip frame.

Figure 36:
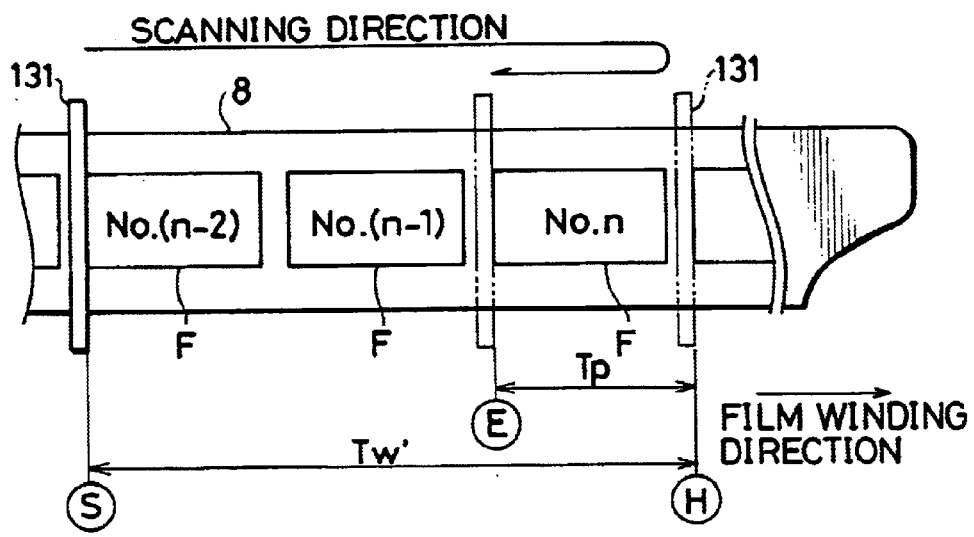
FIG. 36 is a diagram showing a time required to pick up an image recorded in a prewind type film having a skip frame.

FIG. 36 shows a time Ts required to read the image data in the case that the prewind type film has a skip frame. Specifically, FIG. 36 shows the time Ts required to pick up a film image in the case that the image data of the frame No. n is read after skipping the frame No. (n−1). Position S is a scanning end position of the film image of the frame No. (n−2), and a distance between the positions S and H is longer as compared with the case were the frame No. (n−1) is not skipped.

Accordingly, the time required to feed the film 8 from position S to position H in the rewinding direction is Tw'(>Tw) which is longer than the time Tw in the case that the film 8 has no skip frame, and the time Ts required to read the image data is: Ts=Tp+Tw'+Tr.

Since the time Ts required to read the image data changes depending upon the type of the film and the number of skip frames, the display time T (=Ti+Ts) of the film image of each frame varies, making it difficult to switch the BGM song in synchronism with the switch timing of the frames. Further, the variation of the display time of the respective frames and the unsynchronized switch timings of the images and the BGM may give a viewer a sense of incongruity.

In order to avoid the above problem, according to this embodiment, the display time T of the film images of the respective frames is set constant regardless of the type of the film and the presence or absence of the skip frame, and the BGM is switched in synchronism with the switch timing of the block.

More specifically, if the number of frames included in the i-th block B(i) (i=1, 2, . . . ) is N(i), a BGM switch timing T(i) between the blocks B(i) and B(i+1) is: T(i)=(N(1)+N(2)+... +N(i)). Accordingly, after the start of the automatic reproduction, the BGM songs can be smoothly switched in synchronism with the switch timing of the block by fading out and in the BGM song before and after the timing T(i).

If the display time T of the film images of the respective frame is constant, an interval Ti at which the image data of the frames are read changes depending upon the type of the film and the presence or absence of the skip frame(s). Thus, a reading time ST during which the image data of each frame is read is calculated together with the presentation method in Step #502.

The reading time ST is based on the display start timing of the film image of each frame. The reading of the image of the next frame is started upon the lapse of the reading time ST after the display start timing of the frame being presently displayed.

Figure 37:
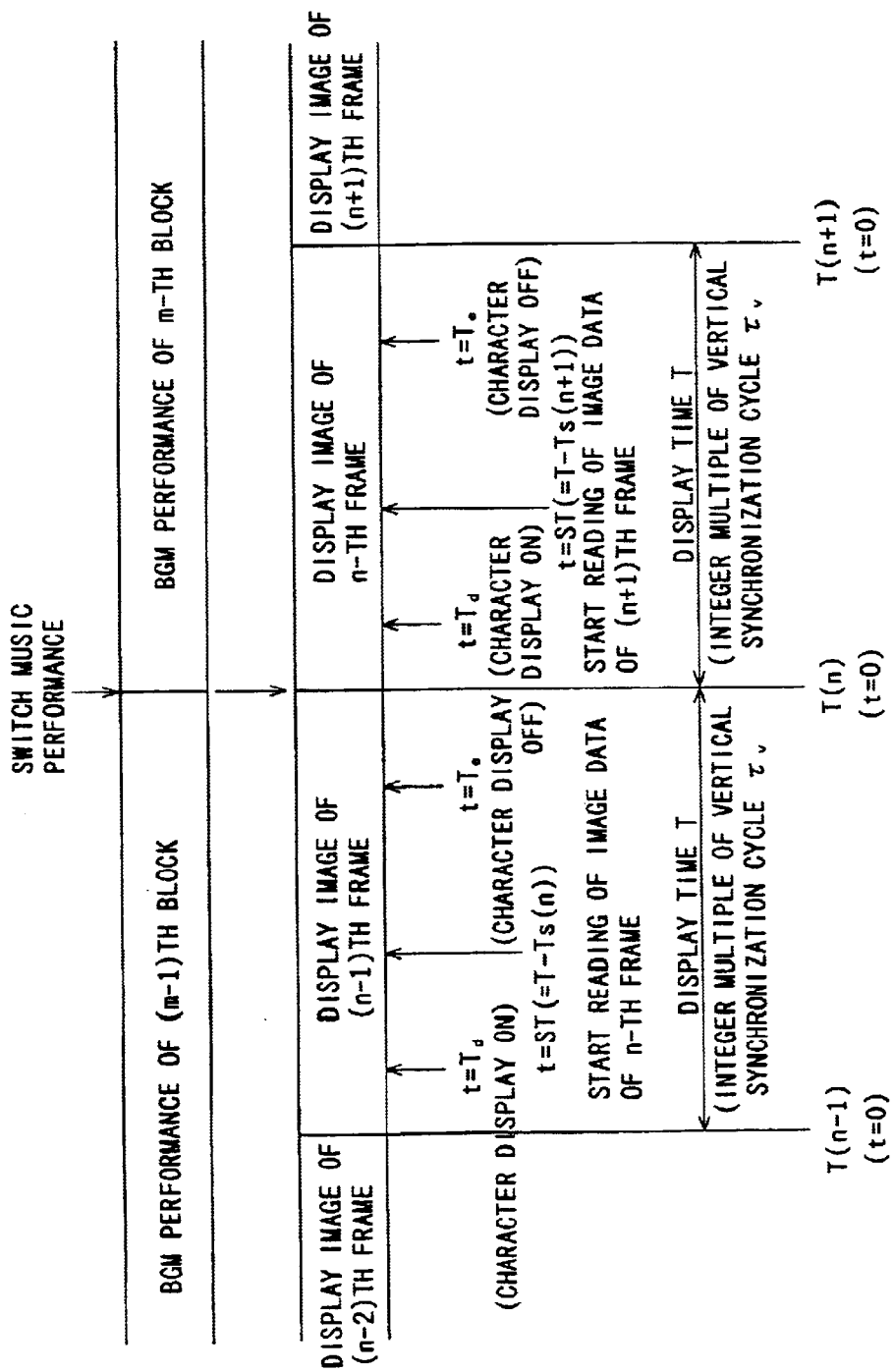
FIG. 37 is a diagram showing a relationship between the presentation of the film images and the reading of the image data in the automatic reproduction.

FIG. 37 is a diagram showing the relationship between the presentation of the film image and the read image data in the automatic reproduction.

In FIG. 37, T(n−1), T(n) and T(n+1) denote image display start timings of the (n−1)th, n-th and (n+1)th frames. Since the display time T of each frame is constant, T=T(n)−T(n−1)=T(n+1)−T(n)=k·τv (k is a constant of an integer).

The (m−1)th block and the m-th block are switched between the (n−1)th frame and the n-th frame, and the BGM song is switched in synchronism with the display switch timing T(n).

The reading of the image of the n-th frame is started upon the lapse of the reading time ST calculated at the beginning of the automatic reproduction after the display start timing T(n−1) of the film image of the (n−1)th frame, and the display of the film image of the n-th frame is started at an image data reading end timing T(n).

Since the reading of the image data of the n-th frame needs to be completed at the timing T(n), the reading time ST=T−Ts(n) if Ts(n) denotes a time required to read the image data Since Ts(n) changes depending upon the type of the film 8 and the presence or absence of the skip frame as described above, the reading time ST is calculated as follows depending upon the type of the film 8 and the presence or absence of the skip frame.

(1) Case of a normal wind type film having no skip frame
ST=T−Ts(n)=T−(Tp+Tr)
based on Ts(n)=(Tp+Tr)

(2) Case of a normal wind type film having skip frames
ST=T−Ts(n)=T−(Tp+Tr+k·Tf)
based on Ts(n)=(Tp+Tr+k·Tf)

(3) Case of a prewind type film having no skip frame
ST=T−Ts(n)=T−(Tp+Tw+Tr)
based on Ts(n)=(Tp+Tw+Tr)

(4) Case of a prewind type film having skip frames
ST=T−Ts(n)=T−(Tp+Tw'+Tr)
based on Ts(n)=(Tp+Tw'+Tr)

The film type is discriminated based on the sequence of dates of photographing of the frames, and the presence or absence of the skip frame is discriminated based on whether or not the skip frame was input in Step #300 or the magnetic information if the information on the presence or absence of the skip frame is recorded on the film 8.

Figure 38:
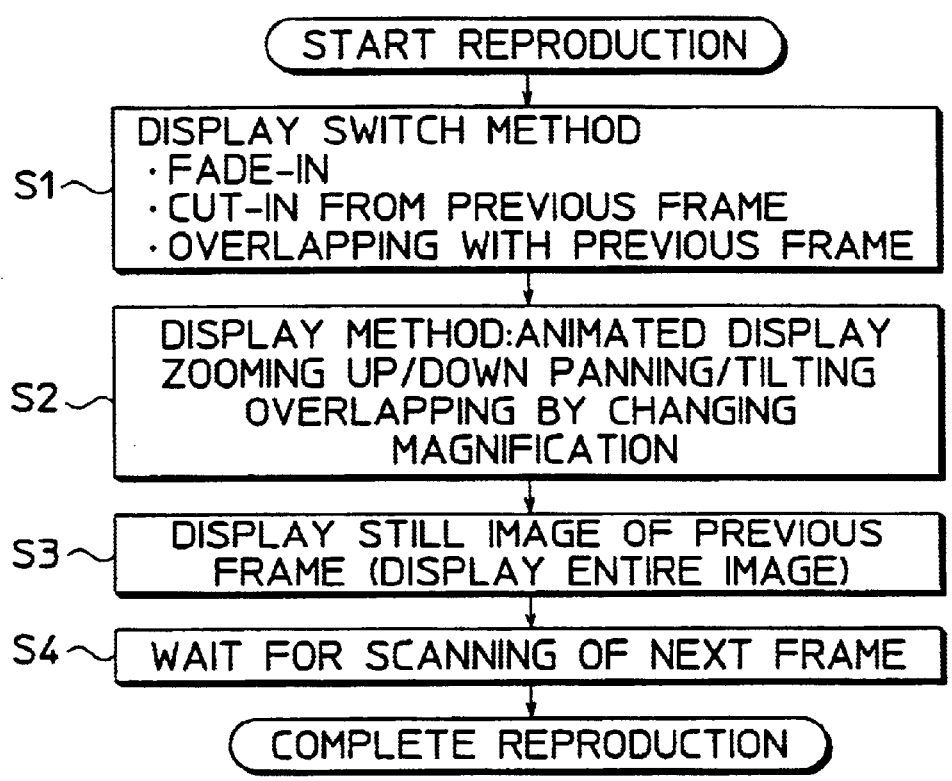
FIG. 38 is a flowchart showing a procedure of the presentation when a display frame switch method and an animated display method are combined.

In the case that the presentation method of the film images is a combination of the display switch method such as fade-in/fade-out and the animated display method such as zooming, it is set in a procedure as shown in FIG. 38.

According to the presentation method shown in FIG. 38, the previous frame is switched to the present frame by a display switch method such as a fade-in, cut-in from the previous frame or overlapping with the previous frame (Step S1). Subsequently, the animated display is made by zooming up or down, panning, tilting or overlapping by changing the magnification (Step S2). Upon the lapse of the reading time ST for the image data of the next frame during the animated display, the animated display of the present frame is switched to a still image display of the entire image of the present frame (Step S3).

The display is switched to the still image display during the animated display for the following reason. If the picking up of the film image of the next frame is started upon the lapse of the reading time ST, the image memory 15 is used only for the writing. Accordingly, the image data of the present frame cannot be read from the image memory 15 and the image is displayed as a still image while the animated display is interrupted.

Figure 39:
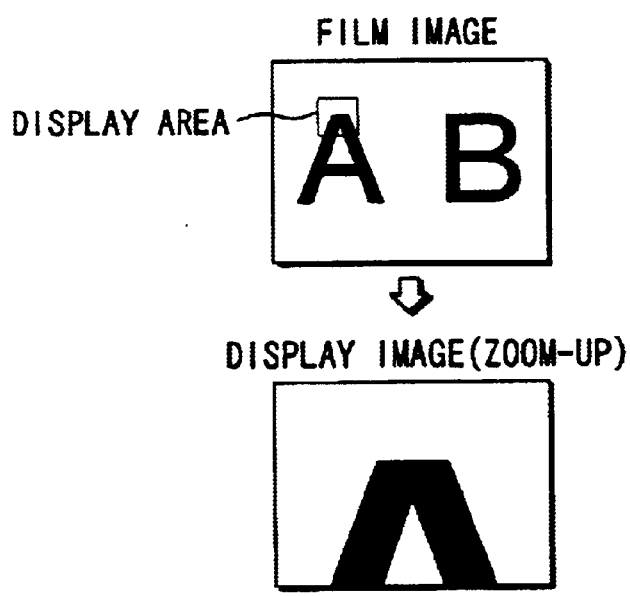
FIG. 39 is a diagram showing an exemplary display of a still image when the animated display by zooming up is interrupted.
Figure 40:
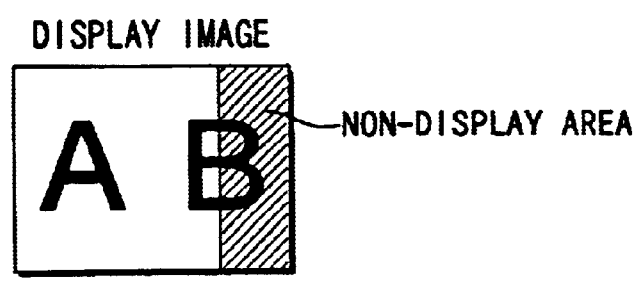
FIG. 40 is a diagram showing an exemplary display of a still image when the animated display by panning is interrupted.

For example, if the animated display is interrupted when the display magnification is large during zooming or an end portion of the film image is displayed during panning/tilting as shown in FIGS. 39 and 40, an unnatural still image not having a main object image is displayed on the monitor TV 2 while the image data of the next frame is read. This considerably reduces the quality of the display image. In order to avoid this, the entire image of the present frame is displayed as a still image.

The music is switched in synchronism with the switch of the display image In order to switch the music and the display image in a natural manner, the present song and display image are caused to fade out and the next song and displayed image area caused to fade in.

Figure 41:
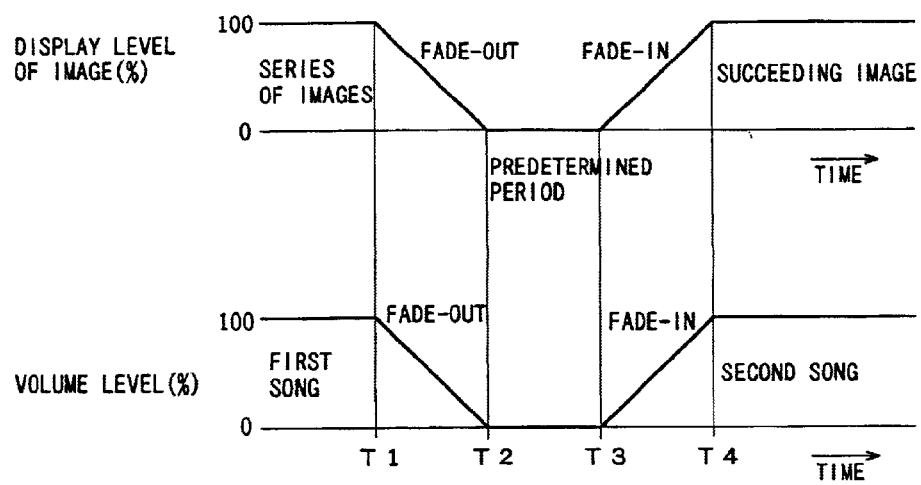
FIG. 41 is a chart showing a first song switch method of switching a song in synchronism with the switch of the display image.
Figure 42:
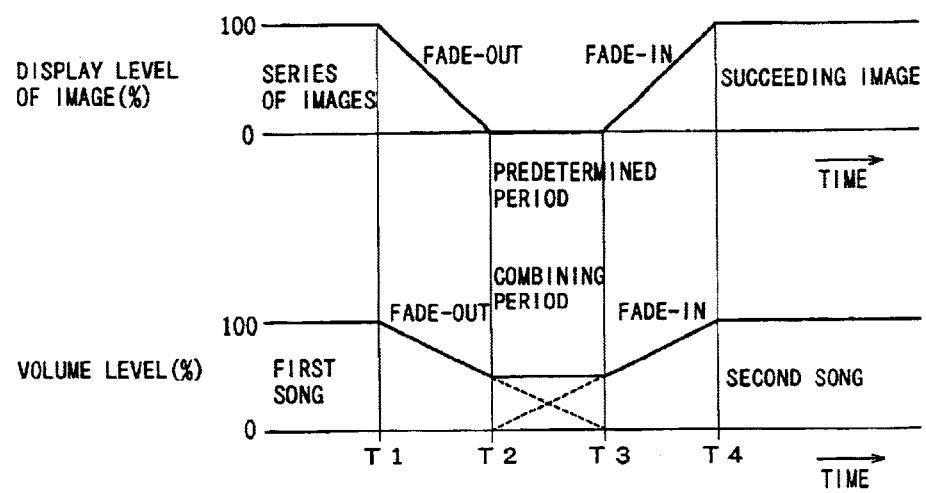
FIG. 42 is a chart showing a second song switch method of switching a song in synchronism with the switch of the display image.

FIGS. 41 and 42 are chart showing first and second song switch methods for switching a song in synchronism with the switch of the display image.

In FIGS. 41 and 42, display and volume levels are relative levels with respect to specified standard levels of 100%. Although the display and volume levels are increased to the specified standard levels in these examples, the upper limits thereof may be set to any desired level.

T1, T2, T3, T4 denote a fade-out start timing of the presently displayed frame, a fade-out end timing of the presently displayed frame, a fade-in start timing of the next frame and a fade-in end timing of the next frame, respectively.

According to the first song switch method, a blank period is provided when the image and song are switched.

The fade-out of the presently song (hereafter, "first song") is started at the fade-out start timing T1, and stopped at the fade-out end timing T2. The fade-in of the song to be played next (hereafter, "second song") is started at the fade-in start timing T3 and is stopped at the fade-in end timing T4. Accordingly, a period between the fed-out end timing T2 and the fade-in start timing T3 is a blank period during which neither the image nor the music is output (see FIG. 41).

According to the second song switch method, the songs are continuously switched.

The fade-out of the first song is started at the fade-out start timing T1 and stopped at the fade-in start timing T3. Further, the fade-in of the second song is started at the fade-in end timing T2 and stopped at the fade-in end timing T4. During a period between the fade-out end timing T2 and the fade-in start timing T3, the first song whose volume is decreasing and the second song whose volume is increasing are combined and output via the loudspeakers 4. The first and second songs can be continuously switched by changing the volume balance of both songs (see FIG. 42).

Accordingly, in the calculation of the presentation method, the song switch timing, the fade-in start and end timings and the fade-out start and end timings of the image and the song, the volume level, the display level of the images, etc. are calculated.

Further, in the animated display by zooming, a presentation method is set according to which the presentation effect is improved by changing the volume of the BGM as the image is enlarged or reduced in size.

Figure 43:
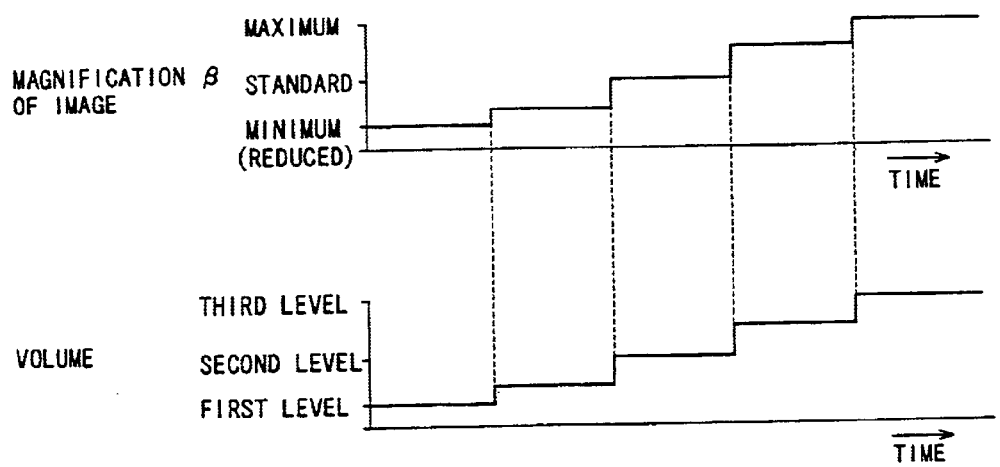
FIG. 43 is a chart showing a first volume change method of changing the volume of the BGM according to the magnification of the image.
Figure 44:
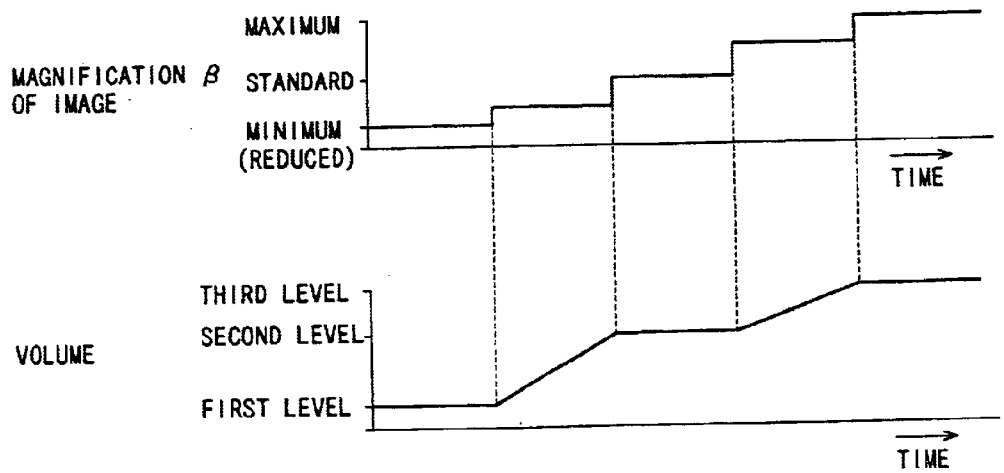
FIG. 44 is a chart showing a second volume change method of changing the volume of the BGM according to the magnification of the image.

FIGS. 43 and 44 are charts showing first and second volume change methods for changing the volume of the BGM according to the magnification of the image.

According to the first volume change method, a variable range of the magnification β of the display image is divided into, e.g. 5 steps (minimum, small, standard, large, maximum) and a variable range of the volume V of the BGM is similarly divided into 5 steps (minimum, low, standard, high, maximum) in correspondence with the respective steps of the magnification β of the display image.

According to this method, the volume V of the BGM changes in steps as the magnification β of the displayed image changes (see FIG. 43).

According to the second volume changing method, the minimum, standard, and maximum steps of the volume V of the BGM are so set as to correspond to the minimum, standard and maximum steps of the magnification β of the display image, and the volume V of the BGM is continuously changed in accordance with a change of the magnification β between the lowest and standard steps and between the standard and highest steps.

According to this method, the volume V of the BGM is smoothly changed in accordance with a change of the magnification β, making a change in the volume V in accordance with a change of the magnification β more natural.

In the case that the volume is changed according to the zooming, the volume V of the BGM (gains of the audio amplifiers 124, 125) is set in correspondence with the magnification β of the image.

Further, the minimum and maximum magnification β of the display image and the minimum and maximum volume V of the BGM may be set so as to correspond to each other, and the volume may be changed between its minimum and maximum levels in accordance with an arbitrary monotone increasing function such as a linear function, an exponential function, or a secondary function.

As another music playing method, the volume of the music may be changed according to the brightness of the film image or the brightness of the display image. For example, the volume is increased in the case of a bright image while being decreased in the case of a dark image.

Further, in the case that the display image is scrolled, the volume balance of the left and right loudspeakers 4 may be changed. For example, a moved amount of the image to the right is at maximum (when the image is scrolled to the rightmost end), the volume of the right channel is set at 100% while the volume of the left channel is set at 50%. In intermediate positions, the volume balance of the left and right channels is set in proportion to the moved amount.

In the case of a monaural output, two kinds of audio signals having the volume balance thereof adjusted as above may be generated and combined.

Referring back to FIG. 32, upon the completion of the calculation of the presentation method, it is discriminated whether the switch timing of the music (BGM) has come (Step #504). If the switch timing of the music has come (YES in Step #504), after the music is switched to the designated song, the display image is switched (Step #508), and the counting by a counter K is started after its count value is reset to an initial value (Step #510). On the other hand, if the song switch timing has not yet come (NO in Step #504), the display image is switched (Step #508) without changing the song and the counting by the counter K is started (Step #510).

The counter K is adapted to measure the display time T for each frame, and counts the display time T using the cycle τv of the vertical synchronization signal of the monitor TV 2 as a counting unit.

Subsequently, it is discriminated based on the count value of the counter K whether the reading time ST during which the image data of the next frame is read has elapsed (Step #512). If the reading time ST has not yet elapsed (NO in Step #512), it is discriminated whether a character display timing and a character erasure timing has come (Step #520 and Step #524).

At the character display timing and the character erasure timing, the display of the character information of the photographing data such as the date of photographing corresponding to the presently displayed frame which is superimposed on the image in a specified position of the display screen 3 for a predetermined period is started and erased, respectively.

The character display is started after the lapse of a predetermined period Td following the start of the image display, and erased after the lapse of a predetermined period Te (0<Td<Te<T) (see FIG. 37). The lapse of the periods Td, Te are discriminated based on the count value of the counter K.

Accordingly, when the counter K counts the predetermined period Td after the start of the image display (YES in Step #520), the character display is started (Step #522). When the counter K counts the predetermined period Te (YES in Step #524), the character display is erased (Step #526).

Subsequently, the read area of the image data is set in the image memory 15 based on the presentation conditions (animated display by zooming, panning, tilting or the like) calculated in Step #502 (Step #528). Further, the write area of the image data read from the image memory 15 is set in the display memory 20 (Step #530).

Subsequently, the presence or absence of the background area is discriminated (Step #532). If the absence of the background area is discriminated (NO in Step #532), the image data read from the read area of the image memory 15 is transferred to the write area of the display memory 20 (Step #536). If the presence of the background area is discriminated (YES in Step #532), after the background data set during the calculation in Step #502 is transferred from the background data device 18 to the display memory 20 (Step #534), the image data read from the read area of the image memory 15 is transferred to the write area of the display memory 20 (Step #536).

Subsequently, the count value of the counter K is incremented by 1 (Step #538), and the gain of the image data to be output from the display memory 20 to the monitor TV 2 is set (Step #540). This gain is set to adjust the level of the image data when the presentation such as fade-in/fade-out or overlapping is performed. The set value of the gain is controlled based on the presentation method calculated in Step #502 and the lapse of time from the start of the image display.

The volume adjustment is also made when the BGM is faded in and out.

After having the level adjusted with the set gain, the image data or the combined data of the background data and the image data transferred to the display memory 20 are output to the monitor TV 2 via the image output device 22 to renew the image being displayed on the display screen 3.

Subsequently, it is discriminated whether the present frame has already been displayed for the predetermined display time T (whether the counter K has counted up the display time T) (Step #542). If the display time T has not yet elapsed (No in Step #542), this routine returns to Step #512 and subsequent Steps to perform the similar operation as above so as to renew the frame image to be displayed on the monitor TV 2 (Steps #512 to #540). The frame image renewing operation is repeated until the display time T of the present frame elapses (a loop of Steps #512 to #540).

When the counter K counts up the reading time ST for the image data of the next frame after the start of the display of the image of the present frame (YES in Step #512), the display is switched to a still image display in which the entire image of the present frame is displayed as a still image (Step #514), and the image data of the next frame is read (Step #516).

The image data is read by moving the color image sensor 131 with respect to the film 8 from the movement start position S to the scanning end position E. A specified signal processing is applied to the image signal picked up by the image pickup device 13 in the image processor 14, and the processed image signal is stored in the image memory 15 after being A/C converted.

In the display processing of the image, the animated display is made by panning, tilting, scrolling or the like by continuously changing the read area of the image memory 15 and transferring the image data read from the read area to the specified write area of the display memory 20. Further, the animated display by zooming is made by transferring the image data read from the read area of the image memory 15 to the specified write area of the display memory 20 while continuously changing the magnification $\beta$ of the image data.

It is essential not to give a viewer a sense of incongruity by giving as natural a motion to the display image in the animated display by panning, tilting, scrolling or the like. However, in the case that the animated display is made on the monitor TV 2 by renewing the frame image in the cycle $\beta v$, the moving speed of the display image cannot be set other than the intermittent speed v' which is an integer multiple of pixel interval of the monitor TV2. The setting of presentation condition by the animated display time, the start position of the image, and the end position of the image causes a variation in the moving speed of the display image as shown in TABLE-1.

TABLE-1 exemplarily shows a moving speed of the display image on the display screen 3 of the monitor TV 2. As mentioned earlier, the display image is moved by moving the read area in the image memory 15 or the write area in the display memory 20 each time the frame image is renewed. Accordingly, a variation in the moving speed of the display image is equivalent to that in the moving speed of the read area or in the moving speed of the write area.

Assuming that s (pixel/τv), td and ADDint denote a moving amount (change of the address) of the read area in the cycle τv (each time the frame image is renewed), a lapse of period after the start of the animated display, and the address (initial address) of the read area of the image memory 15 at the start of the animated display, respectively, an address ADD (pixel) of the read area of the image memory 15 upon the lapse of the period td after the start of the animated display is expressed by ADD=ADDint+td·s. The lapse period td, read area moving amount s, rounded address ADD' (an integer obtained by rounding ADD down), and change difference $\Delta$ADD (=ADD'(td+1)−ADD'(td)) respectively correspond to the period P, change amount $\Delta$d, rounded change amount D', change difference $\Delta$L' in TABLE-1. In the case of the read area moving amount s being 400/300≈1.33 (pixel/vd), accordingly, the change difference ADD' changes with a variation in the difference $\Delta$L' in TABLE-1.

In order to avoid the above problem, in this embodiment, the variation in the address change difference $\Delta$ADD caused by the unit address change s is checked so as to set the address change difference $\Delta$ADD at a most frequently appearing value. For example, in TABLE-1, the address change difference $\Delta$ADD is set at "1", and the image in the read area of the image memory 15 whose address is shifted only by "1" is displayed on the monitor TV 2 each time the frame image is renewed.

Figure 45:
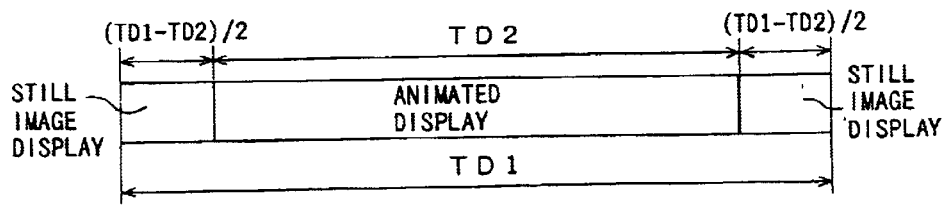
FIG. 45 is a diagram showing a first animated display method in the case that a time during which an animated display is possible is shorter than a presentation time for a designated animated display.
Figure 46:
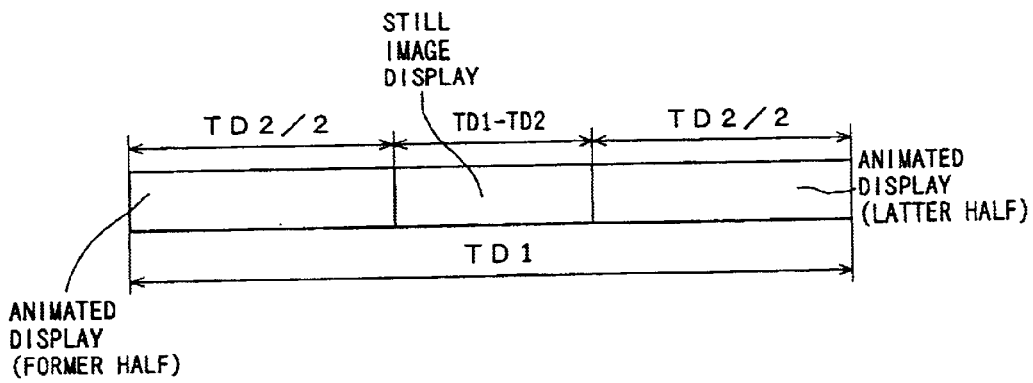
FIG. 46 is a diagram showing a second animated display method in the case where a time during which an animated display is possible is shorter than a presentation time for a designated animated display.

In the case that the animated display enabling time TD2 calculated based on the unit address change s and the movable range of the read area of the image memory 15 is shorter than the animated display presentation time TD1 designated during the calculation in Step #502, still images may be displayed for a time (TD1−TD2)/2 at the beginning and at the end of the presentation time TD 1 as shown in FIG. 45. Alternatively, as shown in FIG. 46, a still image may be displayed for a time (TD1−TD2) between the former and latter halves of the animated display.

If the still image is displayed at the beginning and end of the animated display or at an intermediate stage during the animated display, the still image displayed during the animated display does not stand out, thereby relaxing a sense of incongruity the viewer might have during the animated display.

In the case that there are a plurality of address change differences $\Delta$ADD having the same frequency of appearance, the address change difference $\Delta$ADD may be set at a smallest value in order to ensure as smooth a display as possible. For example, if "1" and "2" appear as frequently in the example of TABLE-1, the address change difference $\Delta$ADD is set to "1".

In the case that an accurate animated display needs to be made within the designated presentation time TD1 such as in the case that the image is moved in synchronism with the music, the address change difference $\Delta$ADD is set at a large value and the moving speed of the animated display is increased so that the animated display enabling time TD2 does not exceed the presentation time TD1. At this time, if TD1>TD2, the display made within the presentation time TD1 is adjusted according to the method shown in FIG. 45 or 46.

The above problem also arises due to the set magnification $\beta$ of the image data in the animated display by zooming. In this case as well, the address change difference $\Delta$ADD is so adjusted as to make the motion of the displayed image smooth.

Referring back to FIG. 32, when the counter K counts up the predetermined display time T, i.e. the display end timing of the present frame has come (YES in Step #542), it is discriminated whether the last frame has been displayed (Step #544). Step #504 follows to display the next frame if the last frame has not yet been displayed (No in Step #544), whereas the automatic reproduction processing is completed and this routine returns if the last frame has been displayed (YES in Step #544).

Referring back to FIG. 29, when the display frame designation key 54 is operated (ON in Step #600), the film image corresponding to the frame number designated by the ten entry keys 54a and the enter key 54b is displayed on the monitor TV 2 (Step #700). This image display corresponds to a manual reproduction.

First, the film 8 is fed until the color image sensor 131 is set at the reading position of the image data corresponding to the designated frame number, and the exposure condition is set to the exposure control value calculated during the prescanning. The color image sensor 131 is moved relative to the film 8 so as to pick up the film image of the designated frame number. The image processor 14 applies a specified signal processing to the picked up signal, which is then stored in the image memory 15 after being A/D converted.

The image stored in the image memory 15 is transferred to the display memory 20 while being rotated by a specified amount based on the orientation information corresponding to the designated frame number so that the film image is displayed on the display screen 3 as an erect image; is output to the monitor TV 2 via the image output device 22; and is displayed on the display screen 3.

Figure 15:
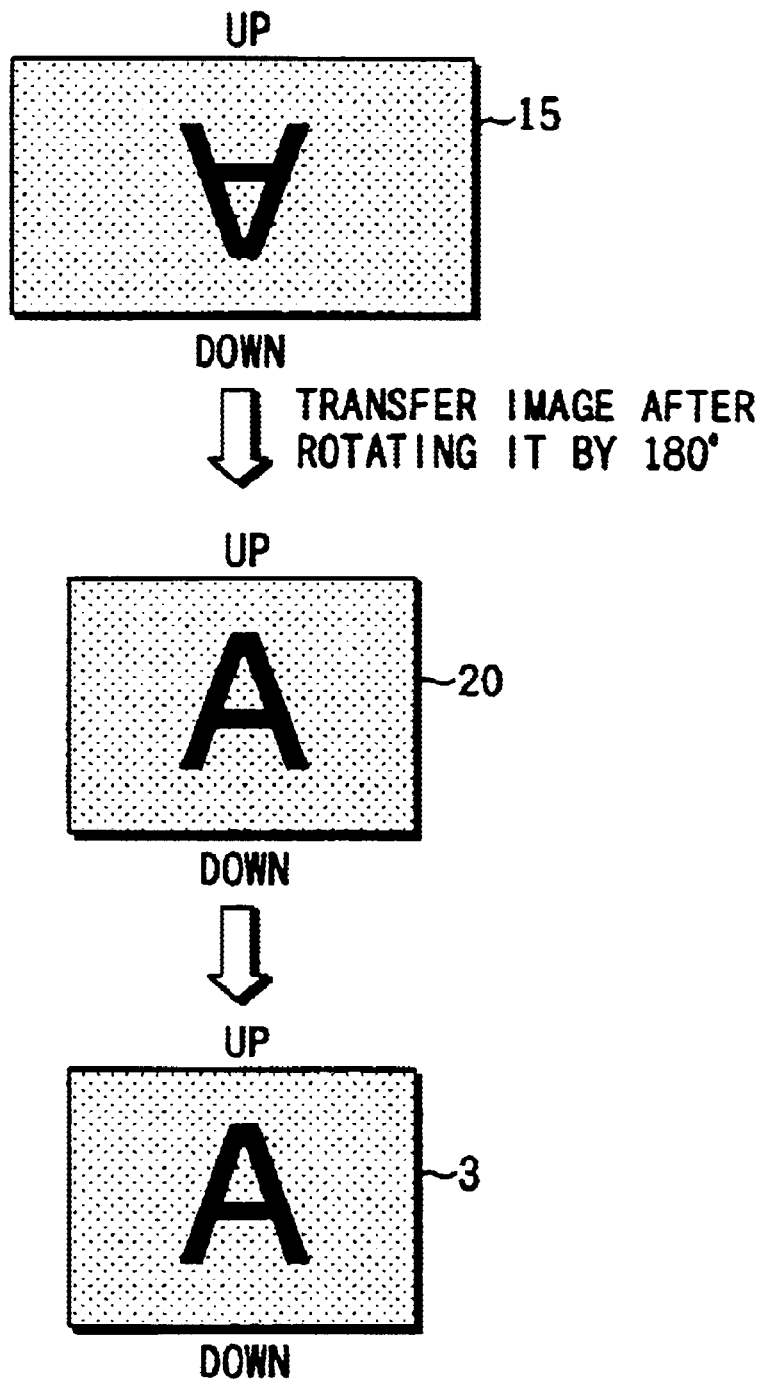
FIG. 15 is a diagram showing a process of the reproduction of an inverted film image when the rotation processing is applied.
Figure 47:
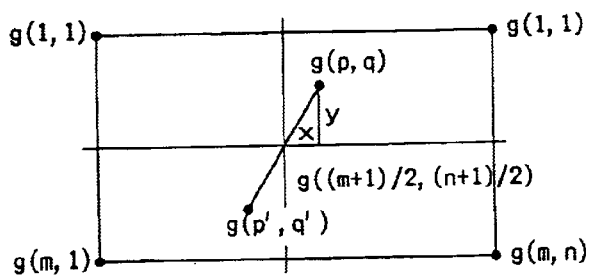
FIG. 47 is a chart showing the conversion of an address of an image in the image memory when the image is rotated by 180°.

For example, in the case that the film image is an inverted image as shown in FIG. 15, the image data read from the image memory 15 is transferred to the display memory 20 after the image is rotated by 180°. Assuming that g(i, j) (i=1 to m, j=1 to n) denotes the address of the pixel data of (i, j) of the image memory 15 and the display memory 20, if the image is rotated by 180° in the image memory 15 as shown in FIG. 47, the pixel data at an address g(p, q) moves to an address g(m+1−p, n+1−q). Accordingly, the pixel data at the address g(p, q) read from the image memory 15 is transferred to the display memory 20 after having its address converted into the address g(m+1−p, n+1−q).

In the case that the vertical direction of the film image is inclined by ±90°, the image data read from the image memory 15 is also transferred to the display memory 20 after performing a specified address conversion in a similar manner.

In the case that the display frame switch key 53 is operated during the manual reproduction, Step #600 is followed by Step #700 in which the display frame is switched according to the operation of the display frame switch key 53. More specifically, every time the "+" key 53a is pressed, the frame number is increased one by one from the one corresponding to the presently displayed image. On the other hand, the frame number is decreased one from the one corresponding to the presently displayed image every time the "−" key 53b is pressed.

When the panning/tilting key 58 is operated (ON in Step #800) during the manual reproduction, the display position of the image on the display screen 3 is moved in the designated direction (Step #900, see FIG. 4). The display position is changed by moving the read area 151 of the image memory 15.

Figure 48:
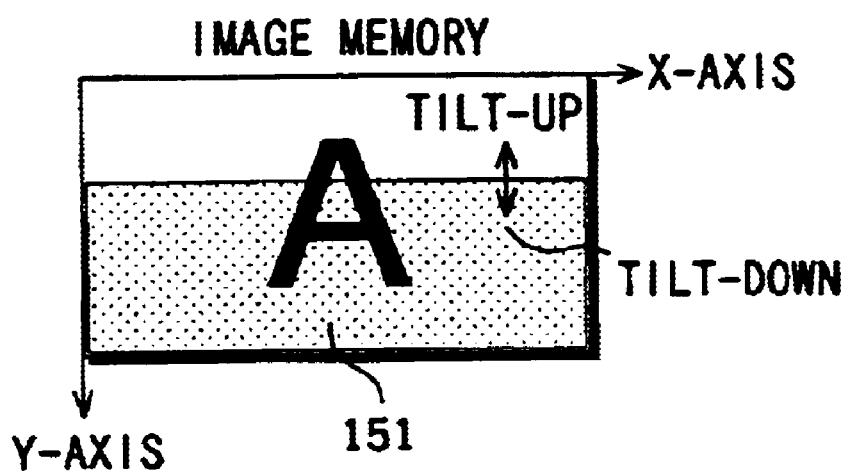
FIG. 48 is a diagram showing moving directions of a read area of the image memory and a write area of the display area when the display image of the erect film image is tilted up and down.

For example, in the case that an erect film image is tilted up or down, the read area 151 of the image memory 15 is moved as shown in FIG. 48. Specifically, every time the up-key 58a is operated, the read area 151 of the image memory 15 is moved by a specified number of rows in the "+" direction (upward direction in FIG. 48) along the y-axis. On the other hand, every time the down-key 58b is operated, the read area 151 is moved by a specified number of rows in the "−" direction (downward direction in FIG. 48) along the y-axis.

In the case that the inverted film image is tilted up or down, since the orientation of the image stored in the image memory 15 is reverse of that of the image to be displayed on the display screen 3, the moving direction of the read area 151 in response to the operation of the up-key 58a or down-key 58b is reverse of the moving direction of the read area 151 when the film image is an erect image.

Figure 49:
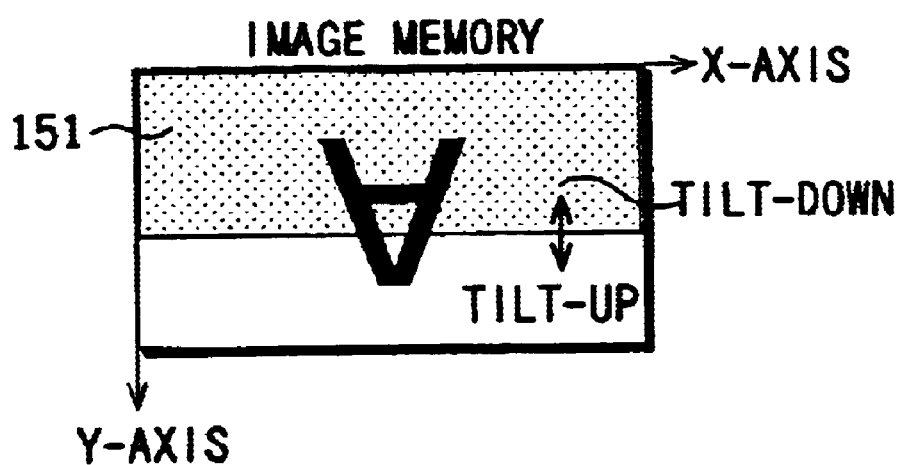
FIG. 49 is a diagram showing moving directions of the read area of the image memory when the displayed image of the inverted film image is tilted up and down.

More specifically, as shown in FIG. 49, every time the up-key 58a is operated, the read area 151 of the image memory 15 is moved by a specified number of rows in the "−" direction (downward direction in FIG. 49) along the y-axis. On the other hand, every time the down-key 58b is operated, the read area 151 is moved by a specified number of rows in the "+" direction (upward direction in FIG. 49) along the y-axis.

Figure 50:
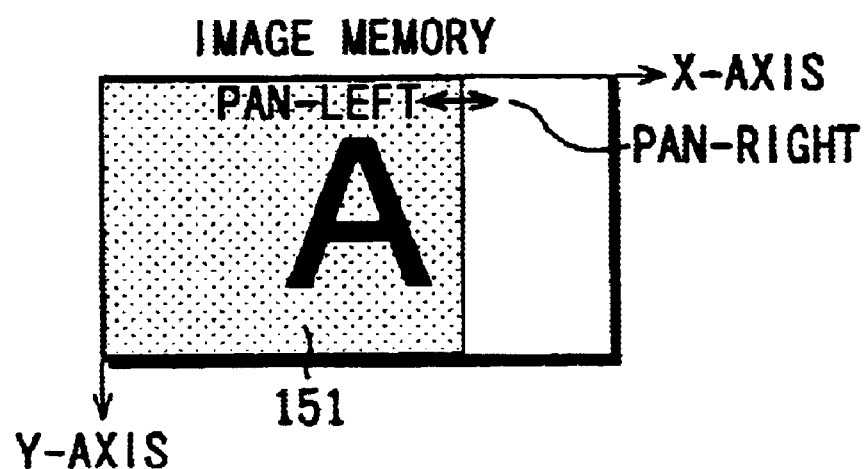
FIG. 50 is a diagram showing moving directions of the read area of the image memory when the displayed image of the erect film image is panned to the right and to the left.

Further, in the case that an erect film image is panned to the right or to the left, the read area 151 of the image memory 15 is moved as shown in FIG. 50. Specifically, every time the right-key 58c is operated, the read area 151 of the image memory 15 is moved by a specified number of columns in the "+" direction (to the right in FIG. 50) along the x-axis. On the other hand, every time the left-key 58d is operated, the read area 151 is moved by a specified number of columns in the "−" direction (to the left in FIG. 50) along the x-axis.

In the case that the inverted film image is panned to the right or to the left, since the orientation of the image stored in the image memory 15 is reverse of that of the image to be displayed on the display screen 3, the moving direction of the read area 151 in response to the operation of the right-key 58c or left-key 58d is reverse of the moving direction of the read area 151 when the film image is an erect image.

Figure 51:
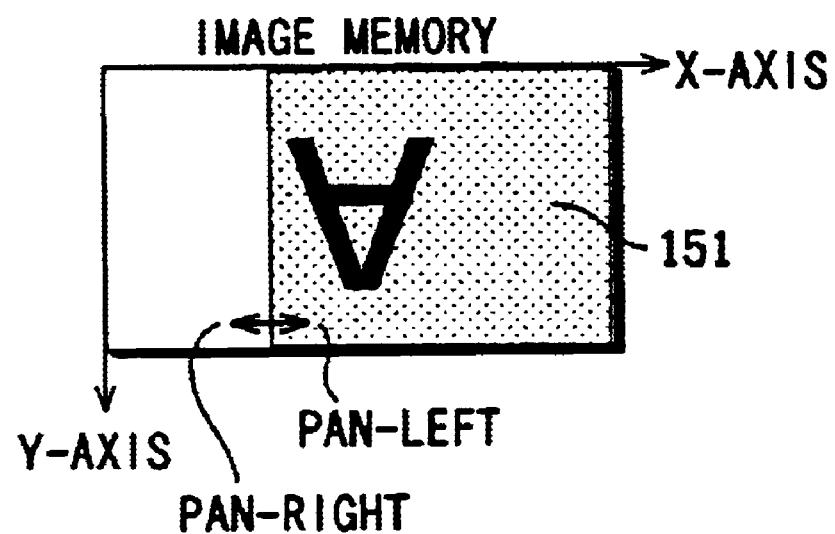
FIG. 51 is a diagram showing moving directions of the read area of the image memory when the display image of the inverted film image is panned to the right and to the left.

More specifically, as shown in FIG. 51, every time the right-key 58c is operated, the read area 151 of the image memory 15 is moved by a specified number of columns in the "−" direction (to the left in FIG. 51) along the x-axis. On the other hand, every time the left-key 58d is operated, the read area 151 is moved by a specified number of columns in the "+" direction (to the right in FIG. 51) along the x-axis.

If the film image is an erect image, the image data read from the read area 151 of the image memory 15 is written in the display memory 20. If the film image is an inverted image, the image data read from the read area 151 of the image memory 15 is written in the display memory 20 after being inverted.

Figure 52:
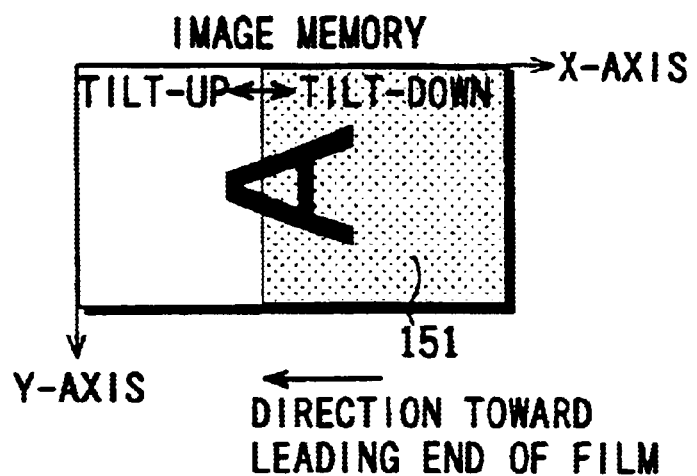
FIG. 52 is a diagram showing moving directions of the read area of the image memory when the display image of the film image inclined toward the leading end of the film by 90° is tilted up and down.

In the case that the film image inclined by 90° toward the leading end of the film is tilted up or down, the read area 151 of the image memory 15 is moved as shown in FIG. 52. Specifically, every time the up-key 58a is operated, the read area 151 of the image memory 15 is moved by a specified number of columns in the "−" direction (to the left in FIG. 52) along the x-axis. On the other hand, every time the down-key 58b is operated, the read area 151 is moved by a specified number of columns in the "+" direction (to the right in FIG. 52) along the x-axis.

Figure 53:
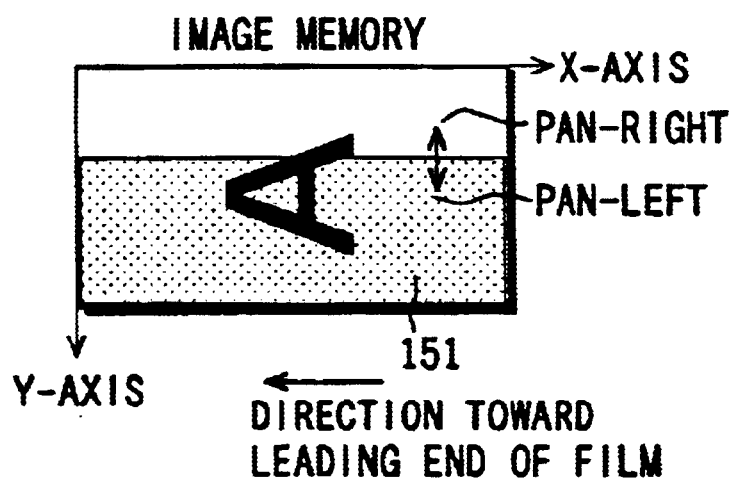
FIG. 53 is a diagram showing moving directions of the read area of the image memory when the displayed image of the film image inclined toward the leading end of the film by 90° is panned to the right and to the left.

In the case that the film image inclined by 90° toward the leading end of the film is panned to the right or to the left, the read area 151 of the image memory 15 is moved as shown in FIG. 53. Specifically, every time the right-key 58c is operated, the read area 151 of the image memory 15 is moved by a specified number of rows in the "+" direction (upward direction in FIG. 53) along the y-axis. On the other hand, every time the left-key 58d is operated, the read area 151 is moved by a specified number of rows in the "−" direction (downward direction in FIG. 53) along the y-axis.

Figure 54:
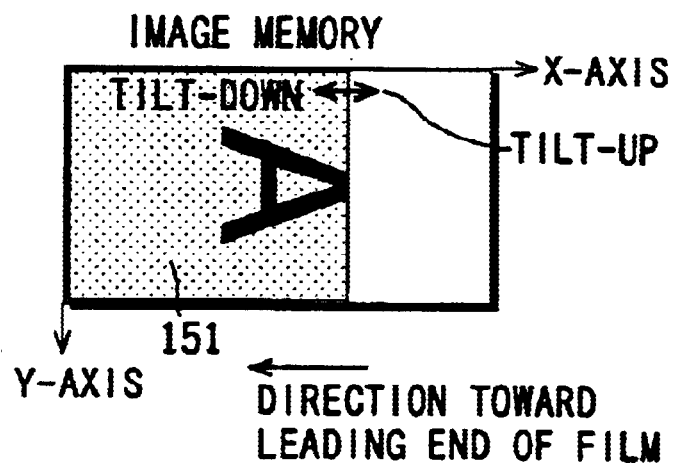
FIG. 54 is a diagram showing moving directions of the read area of the image memory when the displayed image of the film image inclined toward the rear end of the film by −90° is tilted up and down.

In the case that the film image inclined by 90° toward the rear end of the film is tilted up or down, the read area 151 of the image memory 15 is moved as shown in FIG. 54. Specifically, every time the up-key 58a is operated, the read area 151 of the image memory 15 is moved by a specified number of columns in the "+" direction (to the right in FIG. 54) along the x-axis. On the other hand, every time the down-key 58b is operated, the read area 151 is moved by a specified number of columns in the "−" direction (to the left in FIG. 54) along the x-axis.

Figure 55:
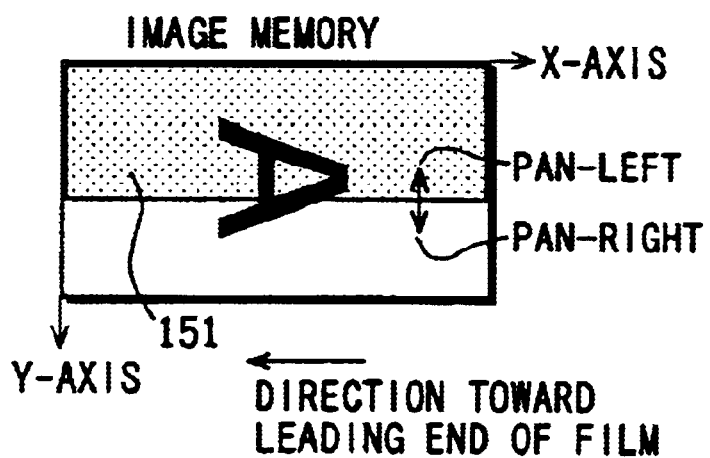
FIG. 55 is a diagram showing moving directions of the read area of the image memory when the displayed image of the film image inclined toward the rear end of the film by −90° is panned to the right and to the left.

In the case that the film image inclined by 90° toward the rear end of the film is panned to the right or to the left, the read area 151 of the image memory 15 is moved as shown in FIG. 55. Specifically, every time the right-key 58c is operated, the read area 151 of the image memory 15 is moved by a specified number of rows in the "−" direction (downward direction in FIG. 55) along the y-axis. On the other hand, every time the left-key 58d is operated, the read area 151 is moved by a specified number of rows in the "+" direction (downward direction in FIG. 55) along the y-axis.

If the film image is inclined by 90& toward the leading end of the film, the image data read from the read area 151 of the image memory 15 is written in the display memory 20 after being rotated by −90°. On the other hand, if the film image is inclined by 90° toward the rear end of the film, the image data read from the read area 151 of the image memory 15 is written in the display memory 20 after being rotated by 90°.

The above relationship between the operation of the panning/tilting key 58 and the moving direction of the read area is defined in a table shown in FIG. 56.

Referring back to FIG. 29, when the zoom key 57 is operated during the manual reproduction (ON in Step #1000), the magnification β of the image data read from the read area 151 of the image memory 15 is changed in predetermined steps according to the operation of the up-key 57a or down-key 57b. In addition, the size of the write area 201 set in the display memory 20 is change to β·S if S denotes the size of the read area 151.

The image data read from the read area 151 of the image memory 15 is written in the write area 201 of the image memory 20 whose size has been changed after being enlarged reduced by the magnification β by the rotating/magnification changing device 17. In this way, the image displayed on the display screen 3 of the monitor TV 2 is enlarged or reduced.

If the size β·S of the write area 201 becomes larger than the size of the storage area of the display memory 20 in the enlarged display, the size of the write area 201 is set at that of the storage area of the display memory 20. Accordingly, only a portion of the image data enlarged by the rotating/magnification changing device 17 which falls within the storage area of the display memory 20 is written in the display memory 20.

If the size β·S of the write area 201 becomes smaller than that of the storage area of the display memory 20 in the reduced display and a background area is to be seen on the displayed screen, a specified background data is written in this background area.

When the eject key 52 is operated during the manual reproduction (ON in Step #1200), the film 8 is rewound into the film cartridge 7. Thereafter, the eject table 6 projects from the apparatus main body (Step #1300), enabling the film cartridge 7 to be taken out. Then, the film image reproduction processing ends.

The present invention has been fully described by way of example with reference to the accompanying drawings. However, it is to be understood that various changes and modifications will be apparent to those skilled in the art. Therefore, unless otherwise such changes and modifications depart from the scope of the present invention, they should be construed as being included therein.

What is claimed is:

1. An image reproducing apparatus comprising:
    a reproducing address area designator which designates a reproducing address area of an image data stored in a memory; and
    a controller which calculates change differences of the address bearing the image per unit time during reproduction of the image, sets the calculated change differences to a constant value, and controls the reproducing address area designator so that a reproducing address of the image changes at the constant value.

2. The image reproducing apparatus according to claim 1, wherein the controller controls the reproducing address area designator to move the reproducing address area of the image to be reproduced.

3. The image reproducing apparatus according to claim 1, wherein the controller controls the reproducing address area designator to change the size of the reproducing address area of the image to be reproduced.

4. The image reproducing apparatus according to claim 1, wherein the controller calculates an address change amount of the reproducing address area in the memory.

5. The image reproducing apparatus according to claim 1, wherein the image reproducing apparatus outputs an image data to be using a display device.

6. An image reproducing apparatus comprising:
    a reproducing address area designator for designating a reproducing address area of an image data stored in memory; and
    a control means for calculating change differences of the address bearing the image per unit time during reproduction of the image, setting the calculated change differences to a constant value, and controlling the reproducing address area designator so that a reproducing address of the image changes at the constant value.

7. The image reproducing apparatus according to claim 6, wherein the control means controls the reproducing address area designating means to move the reproducing address area of the image to be reproduced.

8. The image reproducing apparatus according to claim 6, wherein the control means controls the reproducing address area designating means to change the size of the reproducing address area of the image to be reproduced.

9. The image reproducing apparatus according to claim 6, wherein the control means calculates an address change amount of the reproducing address area in the memory.

10. The image reproducing apparatus according to claim 6, wherein the image reproducing apparatus outputs an image data to be reproduced using a display device.

11. An image processing method for an image reproducing apparatus, comprising the steps of:
    designating a reproducing address area of an image data stored in a memory;
    calculating a change difference of the address bearing the image per unit time during reproduction of the image;
    setting the calculated change difference to a constant value; and
    controlling the reproducing address of the image in accordance with the set constant value.

* * * * *